(12) United States Patent
Nakagawa et al.

(10) Patent No.: US 10,001,373 B2
(45) Date of Patent: Jun. 19, 2018

(54) RESONATOR ELEMENT, ELECTRONIC DEVICE, ELECTRONIC APPARATUS, AND MOVING OBJECT

(71) Applicant: Seiko Epson Corporation, Tokyo (JP)

(72) Inventors: Keiji Nakagawa, Minowa-machi (JP); Ryuta Nishizawa, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 165 days.

(21) Appl. No.: 14/921,786

(22) Filed: Oct. 23, 2015

(65) Prior Publication Data

US 2016/0123734 A1  May 5, 2016

(30) Foreign Application Priority Data

Oct. 29, 2014  (JP) .................................. 2014-220040

(51) Int. Cl.
*G01C 19/5621* (2012.01)
*G01C 19/56* (2012.01)

(52) U.S. Cl.
CPC ......... *G01C 19/5621* (2013.01); *G01C 19/56* (2013.01)

(58) Field of Classification Search
CPC .... G01C 19/08; G01C 19/56; G01C 19/5601; G01C 19/5621
See application file for complete search history.

(56) References Cited

U.S. PATENT DOCUMENTS

| 2004/0099043 | A1 | 5/2004 | Omawari et al. |
| 2004/0263027 | A1 | 12/2004 | Kawashima |
| 2012/0326571 | A1 | 12/2012 | Shimura et al. |
| 2013/0047727 | A1* | 2/2013 | Kim ................... G01C 19/5776 73/504.12 |
| 2013/0081473 | A1* | 4/2013 | Ichikawa ........... G01C 19/5621 73/658 |

FOREIGN PATENT DOCUMENTS

| JP | 10-132573 | A | 5/1998 |
| JP | 2002-243451 | A | 8/2002 |
| JP | 2006-017469 | A | 1/2006 |
| JP | 2007-202211 | A | 8/2007 |
| JP | 2010-175286 | A | 8/2010 |
| JP | 2013-009221 | A | 1/2013 |

\* cited by examiner

*Primary Examiner* — David M Gray
*Assistant Examiner* — Andrew V Do
(74) *Attorney, Agent, or Firm* — Oliff PLC

(57) ABSTRACT

A gyro element as a resonator element includes a drive resonating arm as a drive portion that is driven by application of a voltage, and a detection resonating arm as a detection portion in which charge is generated in response to a Coriolis force generated in the drive resonating arm. An amount of charge detected in the detection resonating arm in a state where the Coriolis force is not generated is greater than 0% and equal to or less than 0.1% of an amount of charge generated in the drive resonating arm when driving the drive resonating arm.

14 Claims, 11 Drawing Sheets

| CHARGE AMOUNT RATIO (%) | 0.06 | 0.08 | 0.10 | 0.12 | 0.14 |
|---|---|---|---|---|---|
| DETECTION OF ANGULAR VELOCITY (%) | GOOD | GOOD | GOOD | NO GOOD | NO GOOD |

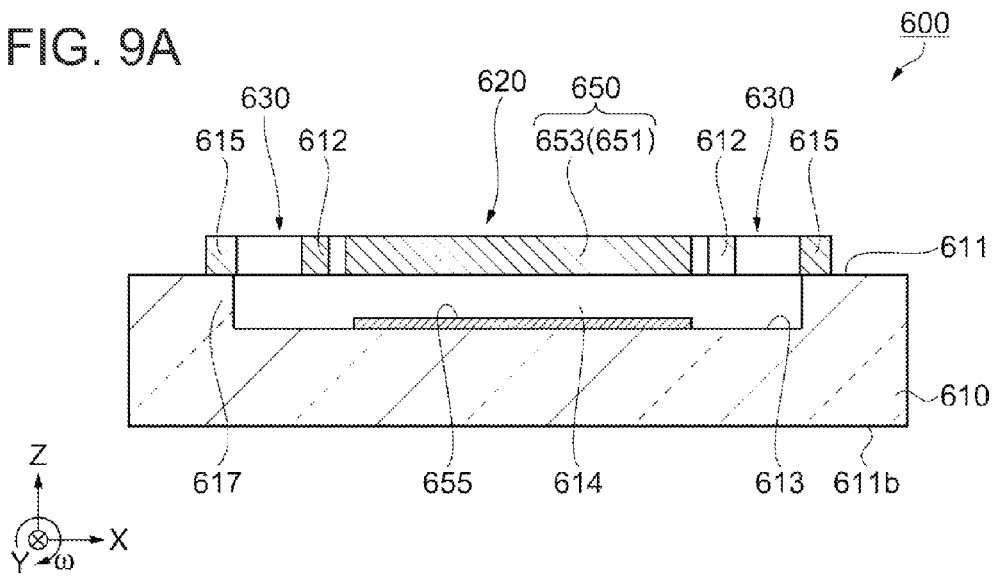
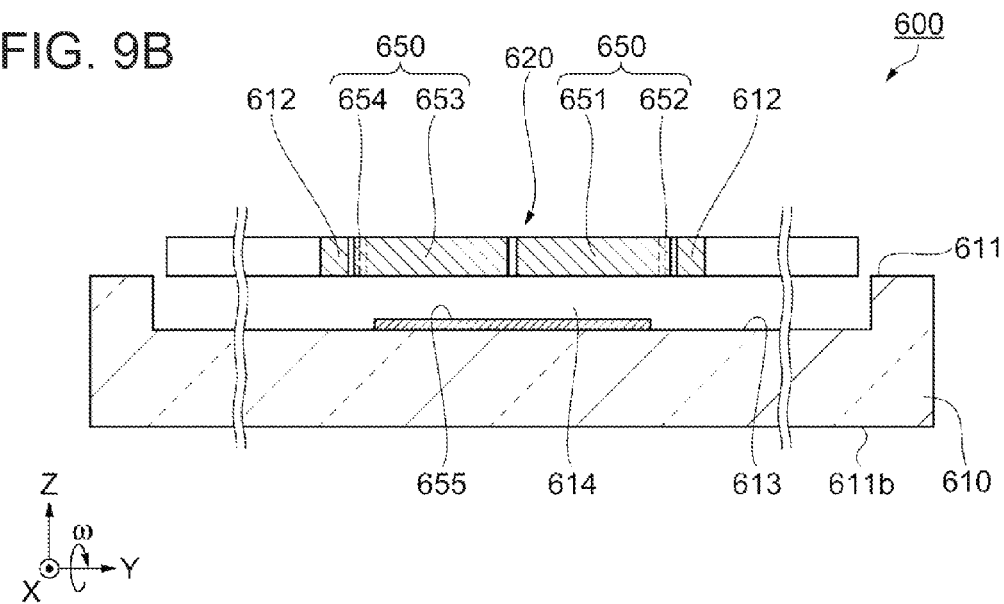

RESONATOR ELEMENT, ELECTRONIC DEVICE, ELECTRONIC APPARATUS, AND MOVING OBJECT

BACKGROUND

1. Technical Field

The present invention relates to a resonator element, an electronic device, an electronic apparatus, and a moving object.

2. Related Art

In the related art, a resonator element in which, for example, a resonating arm is caused to flexurally vibrate utilizing a piezoelectric phenomenon of a piezoelectric body such as quartz crystal is known. The resonator element using quartz crystal has excellent frequency-temperature characteristics, and therefore is widely used as a reference frequency source or a signal transmission source in various types of communication apparatuses or electronic apparatuses. Moreover, a gyro sensor is used in electronic apparatuses that perform car body control in a vehicle, self-position detection of a car navigation system, vibration control correction (so-called camera shake correction) of a digital camera, a camcorder, and a mobile phone, and the like. The resonator element that flexurally vibrates is used as an element that detects an angular velocity in the gyro sensor.

As these electronic apparatuses are miniaturized, the resonator element is also required to be miniaturized. When the resonator element is miniaturized, the processing accuracy in forming the resonator element becomes relatively high. For example, in the resonator element including a resonating arm, when the shape of the resonating arm is asymmetrical, an oblique vibration including displacement in an in-plane direction caused by a primary vibration and displacement in an out-of-plane direction intersecting the in-plane direction caused by a leakage vibration is generated. As a method for eliminating the oblique vibration, a manufacturing method of a flexural vibrator element is known, as disclosed in JP-A-2013-9221, in which a metal film (adjustment film) formed in a coupling area between a resonating arm and a base portion is trimmed by a laser.

When, however, it is intended to completely eliminate the oblique vibration of the gyro element using the manufacturing method of the flexural vibrator element disclosed in JP-A-2013-9221, the yield of the gyro element is remarkably reduced. Moreover, since the load of a process of individually trimming the gyro element is increased, there is a problem that the manufacturing cost of the gyro element is increased.

SUMMARY

An advantage of some aspects of the invention is to solve at least a part of the problems described above, and the invention can be implemented as the following forms or application examples.

Application Example 1

This application example is directed to a resonator element including: a drive portion that is driven by application of a voltage; and a detection portion in which charge is generated in response to a Coriolis force generated in the drive portion, wherein an amount of charge detected in the detection portion in a state where the Coriolis force is not generated is greater than 0% and equal to or less than 0.1% of an amount of charge generated in the drive portion when driving the drive portion.

According to this application example, an angular velocity applied to the resonator element can be obtained by detecting, with a charge amplifier, the charge appearing in the detection portion in response to the Coriolis force generated in a direction intersecting a drive direction of the drive portion, and processing the charge. The drive portion generates, due to the asymmetry or the like of its cross-sectional shape, an oblique vibration including displacement in an in-plane direction as a primary vibration and displacement in an out-of-plane direction intersecting the in-plane direction caused by a leakage vibration. When charge is detected from the detection portion also in a state where no angular velocity is applied to the resonator element because of the displacement due to the leakage vibration, and the amount of the charge and charge generated by the application of an angular velocity exceeds an allowable input of the charge amplifier and is input to the charge amplifier, the charge amplifier is brought into saturation and thus cannot detect the angular velocity applied to the resonator element. It was found, as a result of obtaining the relationship between the saturation of the charge amplifier and the amount of charge, that the resonator element can detect the angular velocity without the saturation of the charge amplifier when the percentage of the amount of charge detected in a detection electrode in the state where no angular velocity is applied is up to 0.1% of the amount of charge generated in a drive electrode by applying a voltage to the drive electrode. Due to this, as a resonator element used for a gyro sensor, it is unnecessary that the displacement of the resonator element in the out-of-plane direction should be suppressed more than necessary, an improvement in the yield of the resonator element and a reduction in the load required for trimming the resonator element are achieved, and thus the manufacturing cost of the resonator element can be reduced.

Application Example 2

In the resonator element according to the application example, it is preferable that the resonator element further includes a base portion, the drive portion extends from one edge of the base portion, and the detection portion extends from another edge on the side opposite to the one edge of the base portion with the base portion as a boundary in a plan view.

According to this application example, the resonator element is a resonator element having a so-called H-type configuration including the drive portion extending from one edge of the base portion and the detection portion extending from another edge on the side opposite to the one edge of the base portion with the base portion as the boundary. Since a drive system and a detection system are separated from each other in the H-type configuration, electrostatic coupling between electrodes or between wirings of the drive system and the detection system is reduced and thus detection sensitivity for angular velocity can be stabilized.

Application Example 3

In the resonator element according to the application example, it is preferable that the resonator element further includes a pair of adjustment portions, the pair of adjustment portions extend from the base portion, so that the pair of adjustment portions are located so as to interpose the detection portion or the drive portion therebetween.

According to this application example, in the resonator element, the amount of charge to be generated in the detection portion by the leakage vibration can be adjusted by trimming the adjustment portions.

Application Example 4

In the resonator element according to the application example, it is preferable that the resonator element further includes a base portion and coupling portions extending on both sides of the base portion from the base portion along a first direction, the detection portion extends on both sides of the base portion from the base portion along a second direction intersecting the first direction, and the drive portion extends on both sides of each of the coupling portions from each of the coupling portions along the second direction, so that the drive portions are located so as to interpose the detection portions therebetween.

According to this application example, the resonator element has a so-called double-T type configuration including two coupling portions extending on both sides of the base portion along the first direction, two detection portions extending from the base portion on both sides with the coupling portion as the boundary along the second direction as a direction intersecting the extending direction of the coupling portion, and four drive portions extending on both sides of each of the coupling portions along the second direction and located so as to interpose the detection portions therebetween. Since the drive system and the detection system are separated from each other in a point-symmetrical manner in the double-T type configuration, electrostatic coupling between electrodes or between wirings of the drive system and the detection system is further reduced and thus detection sensitivity for angular velocity can be further stabilized.

Application Example 5 and Application Example 7

In the resonator element according to the application example, it is preferable that a weight portion is provided on a distal end side of at least one of the drive portion and the detection portion on the side opposite to one edge side of the base portion.

According to these application examples, the weight portion is provided on the distal end side of at least one of the drive portion and the detection portion on the side opposite to the one edge side of the base portion. Therefore, a predetermined drive vibration or detection vibration is obtained while suppressing an increase in the lengths of the drive portion and the detection portion, and also, a broad adjustment range is secured for suppressing the leakage vibration. Therefore, it is possible to provide the resonator element that is more miniaturized and has highly sensitive characteristics.

Application Example 6

In the resonator element according to the application example, it is preferable that a weight portion is provided on a distal end side of at least one of the drive portion, the detection portion, and the adjustment portions on the side opposite to one edge side of the base portion.

According to this application example, the weight portion is provided on the distal end side of at least one of the drive portion, the detection portion, and the adjustment portions on the side opposite to the one edge side of the base portion. Therefore, a predetermined drive vibration or detection vibration is obtained while suppressing an increase in the lengths of the drive portion, the detection portion, and the adjustment portion, and also, a broad adjustment range is secured for suppressing the leakage vibration. Therefore, it is possible to provide the resonator element that is more miniaturized and has highly sensitive characteristics.

Application Example 8, Application Example 9, Application Example 10, Application Example 11, and Application Example 12

Each of these application examples is directed to an electronic device including: the resonator element according to the application example; an electronic component including a drive circuit that excites at least the drive portion; and a package that accommodates at least one of the resonator element and the electronic component.

According to these application examples, since the electronic device includes the resonator element at low cost, it is possible to provide the electronic device at low cost.

Application Example 13

This application example is directed to an electronic apparatus including the resonator element according to the application example.

According to this application example, since the electronic apparatus includes the resonator element at low cost, it is possible to provide the electronic apparatus at low cost.

Application Example 14

This application example is directed to a moving object including the resonator element according to the application example.

According to this application example, since the moving object includes the resonator element at low cost, it is possible to provide the moving object at low cost.

BRIEF DESCRIPTION OF THE DRAWINGS

The invention will be described with reference to the accompanying drawings, wherein like numbers reference like elements.

FIGS. 1A and 1B schematically show a gyro element as one example of a resonator element according to Embodiment 1, in which FIG. 1A is a perspective view and FIG. 1B is a plan view.

FIGS. 2A and 2B are diagrams for explaining an electrode configuration of the gyro element, in which FIG. 2A is a cross-sectional view taken along the line A-A in FIG. 1B and FIG. 2B is a cross-sectional view taken along the line B-B in FIG. 1B.

FIG. 9A is a cross-sectional view taken along the line E-E in FIG. 8; and FIG. 9B is a cross-sectional view taken along the line F-F in FIG. 8.

DESCRIPTION OF EXEMPLARY EMBODIMENTS

Figure 1A:
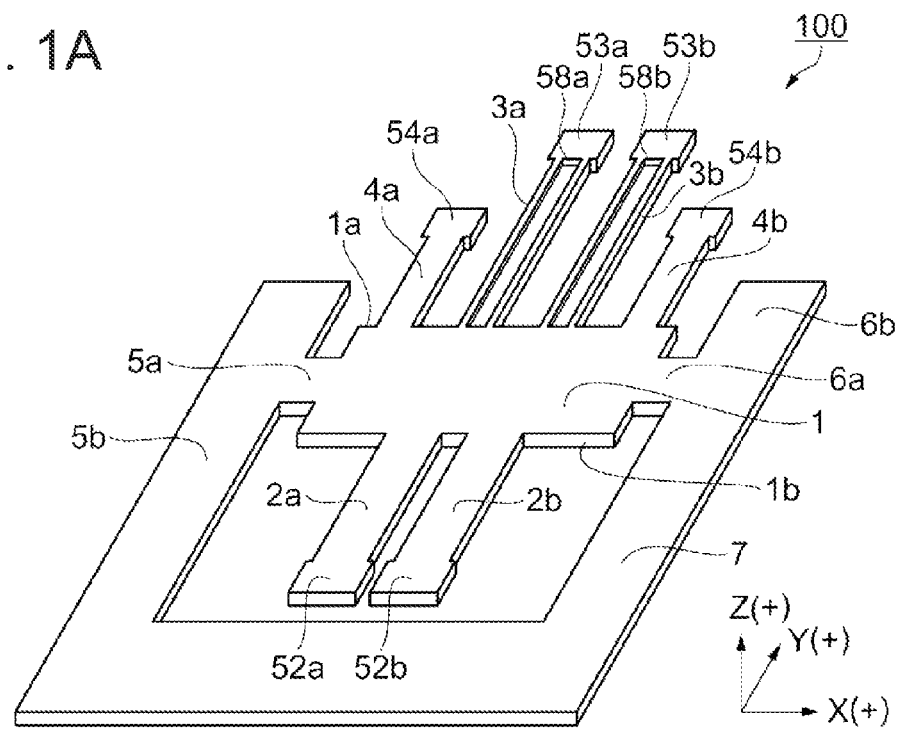

Hereinafter, embodiments of the invention will be described with reference to the drawings. In the drawings below, the scales of layers or members are different from actual ones so that the layers or members have a recognizable size. Moreover, in FIGS. 1A to 3C and FIGS. 7 to 9B, an X-axis, a Y-axis, and a Z-axis are shown as three axes orthogonal to one another for convenience of description, in which the head side of each arrow shown in the drawings is defined as "+side" and the tail side is defined as "−side". Moreover, in the following description, a direction parallel to the X-axis as a first direction is referred to as "X-axis direction", a direction parallel to the Y-axis as a second direction is referred to as "Y-axis direction, and a direction parallel to the Z-axis is referred to as "Z-axis direction".

Embodiment 1

Gyro Element-1

Figure 1B:
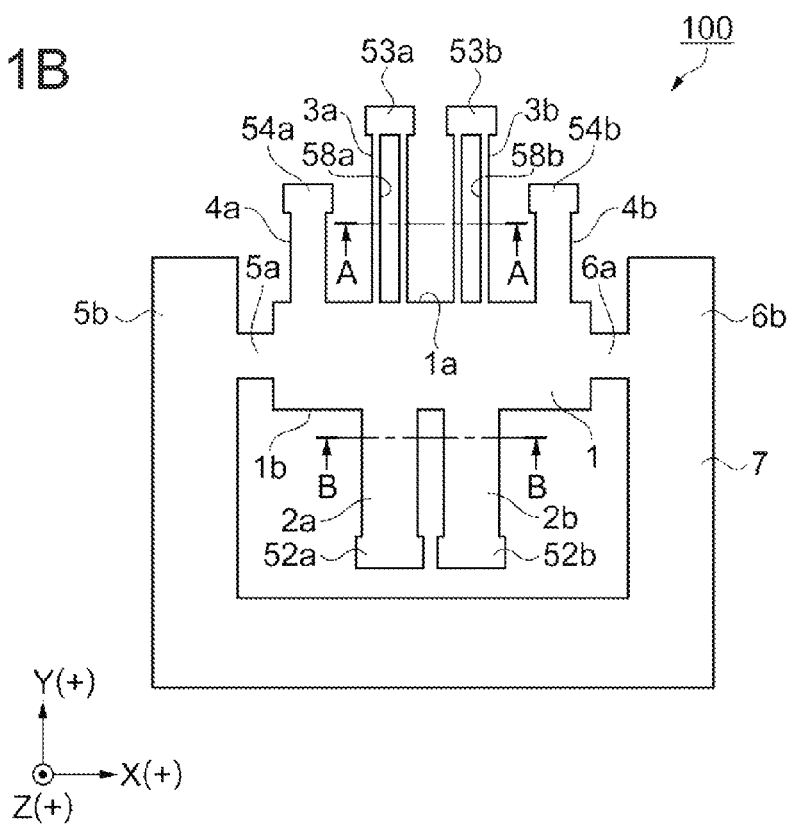
Figure 2A:
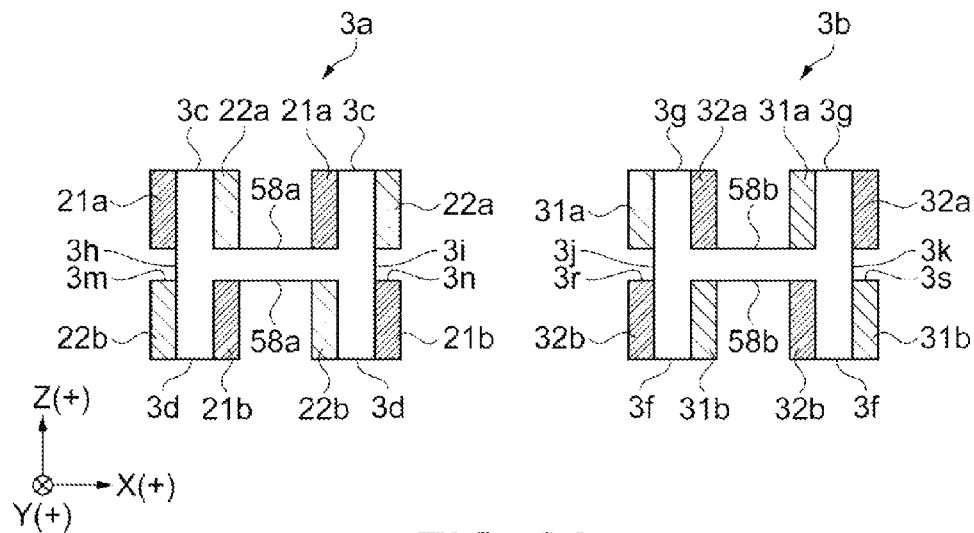
Figure 2B:
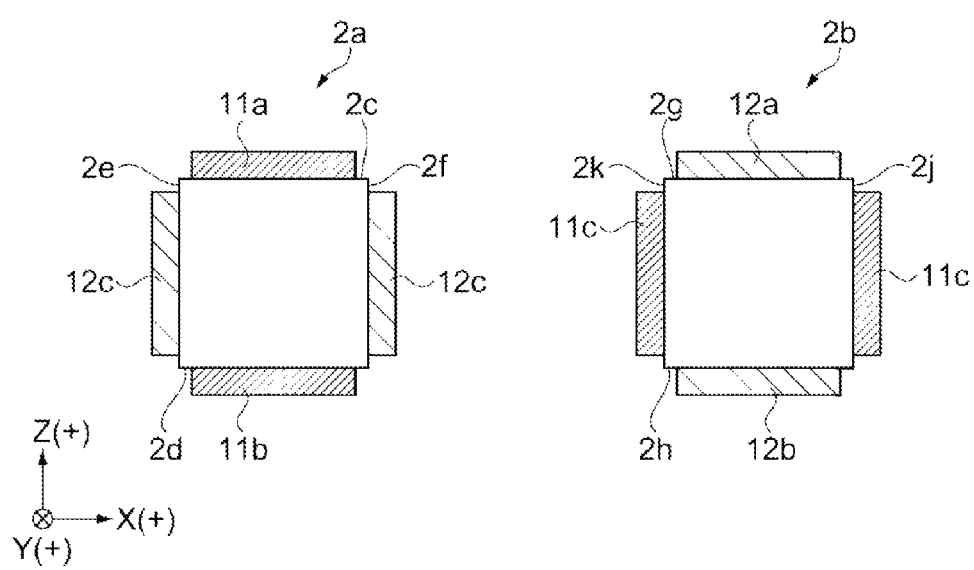

First, a gyro element as a resonator element according to Embodiment 1 will be described with reference to FIGS. 1A to 2B. FIG. 1A is a perspective view schematically showing the gyro element; and FIG. 1B is a plan view schematically showing the gyro element. FIGS. 2A and 2B are diagrams for explaining an electrode configuration of the gyro element, in which FIG. 2A is a cross-sectional view taken along the line A-A in FIG. 1B and FIG. 2B is a cross-sectional view taken along the line B-B in FIG. 1B.

As shown in FIG. 1A, the gyro element 100 according to Embodiment 1 includes a drive portion that is driven by application of a voltage, and a detection portion in which charge is generated in response to the influence of a Coriolis force generated in the drive portion. Specifically, the gyro element 100 includes a base portion 1, drive resonating arms 2a and 2b as drive portions, detection resonating arms 3a and 3b as detection portions, and adjusting resonating arms 4a and 4b as adjustment portions, all of which are integrally formed by processing a base material (material constituting a main portion). Further, the gyro element 100 is provided with a first coupling portion 5a extending from the base portion 1, a first support portion 5b coupled to the first coupling portion 5a, a second coupling portion 6a extending from the base portion 1 in a direction opposite to the first coupling portion 5a, and a second support portion 6b coupled to the second coupling portion 6a. Further, the first support portion 5b and the second support portion 6b are integrally connected on the side of the drive resonating arms 2a and 2b to thereby constitute a fixed frame portion 7. The gyro element 100 is fixed at predetermined positions of the fixed frame portion 7 to a substrate of a package (not shown) or the like.

In the gyro element 100 of the embodiment, an example of using, as the base material, quartz crystal that is a piezoelectric material will be described. Quartz crystal has an X-axis called an electrical axis, a Y-axis called a mechanical axis, and a Z-axis called an optic axis. In the embodiment, an example of using, as the base material, a so-called quartz crystal Z-plate will be described. The quartz crystal Z-plate is obtained by cutting quartz crystal along a plane defined by the X-axis and the Y-axis orthogonal to each other in the crystal axes of quartz crystal and then processing the cut quartz crystal in a plate shape. The quartz crystal Z-plate has a predetermined thickness in the Z-axis direction orthogonal to the plane. The "predetermined thickness" as used herein is appropriately set depending on the oscillation frequency (resonance frequency), external sizes, workability, and the like. Moreover, for the plate forming the gyro element 100, errors in the angle of cut from quartz crystal are acceptable within some range about each of the X-axis, the Y-axis, and the Z-axis. For example, a plate cut by being rotated about the X-axis within the range of 0 to 2 degrees can be used. The same applies to the Y-axis and the Z-axis.

The gyro element 100 includes the base portion 1 having a substantially rectangular shape and located at the central portion, the drive resonating arms 2a and 2b as a pair of drive portions extending along the Y-axis so as to be parallel to each other from one edge (edge in the (−)Y-direction in the drawing) 1b of edges 1a and 1b of the base portion 1 in the Y-axis direction, and the detection resonating arms 3a and 3b as a pair of detection portions extending along the Y-axis so as to be parallel to each other from the other edge (edge in the (+)Y-direction in the drawing) 1a on the side opposite to the one edge 1b of the base portion 1 with the base portion 1 as the boundary. In this manner, the pair of drive resonating arms 2a and 2b and the pair of detection resonating arms 3a and 3b extend in the same axial direction from the respective edges 1a and 1b of the base portion 1. Because of such a shape, the gyro element 100 according to the embodiment is sometimes called an H-type gyro element. In the H-type gyro element 100, since the drive resonating arms 2a and 2b and the detection resonating arms 3a and 3b extend from the respective edges 1a and 1b of the base portion 1 in the same axial direction, a drive system and a detection system are separated from each other. Since the drive system and the detection system are separated from each other as described above, the gyro element 100 has a feature that electrostatic coupling between electrodes or between wirings of the drive system and the detection system is reduced and thus detection sensitivity is stabilized. Although Embodiment 1 employs, as an example, the H-type gyro element in which two drive resonating arms and two detection resonating arms are provided, the number of each of the resonating arms may be one or three or more. Moreover, drive electrodes and detection electrodes, which will be described later, may be formed on one resonating arm.

In the H-type gyro element 100, when an angular velocity ω is applied about the Y-axis in a state where the pair of drive resonating arms 2a and 2b are vibrated in the in-plane direction (+X-axis direction and −X-axis direction), a Coriolis force is generated in the drive resonating arms 2a and 2b, and the drive resonating arms 2a and 2b flexurally vibrate in opposite directions from each other in the out-of-plane direction (+Z-axis direction and −Z-axis direction) intersecting the in-plane direction. Then, the detection resonating arms 3a and 3b resonate with the flexural vibration of the drive resonating arms 2a and 2b in the out-of-plane direction, and thus flexurally vibrate similarly in the out-of-plane direction. At this time, charge is generated, due to a piezoelectric effect, in the detection electrodes provided on the detection resonating arms 3a and 3b. By detecting the charge, the gyro element 100 can detect the angular velocity ω applied to the gyro element 100.

The pair of drive resonating arms 2a and 2b as the drive portions extending from the base portion 1 include, as shown in FIGS. 2A and 2B, front surfaces 2c and 2g, rear surfaces 2d and 2h provided on the side opposite to the front surfaces 2c and 2g, side surfaces 2e, 2f, 2k, and 2j connecting the front surfaces 2c and 2g with the rear surfaces 2d and 2h. Moreover, substantially rectangular-shaped weight portions 52a and 52b that are wider (larger in dimension in the X-axis direction) than the drive resonating arms 2a and 2b are provided on the distal end side of the drive resonating arms 2a and 2b on the side opposite to one edge side of the base portion 1 (refer to FIGS. 1A and 1B). In this manner, since the weight portions 52a and 52b are provided in the drive resonating arms 2a and 2b, a predetermined drive vibration can be obtained while suppressing an increase in the length (dimension in the Y-axis direction) of the drive resonating arms 2a and 2b, and thus the gyro element can be miniaturized. Although the drive resonating arms 2a and 2b are provided with electrodes for driving the drive resonating arms 2a and 2b, the configuration of the electrodes will be described later.

The detection resonating arms 3a and 3b as the pair of detection portions extending from the base portion 1 include front surfaces 3c and 3g, rear surfaces 3d and 3f provided on the side opposite to the front surfaces 3c and 3g, and side surfaces 3h, 3i, 3j, and 3k connecting the front surfaces 3c and 3g with the rear surfaces 3d and 3f.

Further, substantially rectangular-shaped weight portions 53a and 53b that are wider (larger in dimension in the X-axis direction) than the detection resonating arms 3a and 3b are provided on the distal end side of the detection resonating arms 3a and 3b on the side opposite to one edge side of the base portion 1 (refer to FIGS. 1A and 1B). In this manner, since the weight portions 53a and 53b are provided in the detection resonating arms 3a and 3b, a predetermined detection vibration can be obtained while suppressing an increase in the length (dimension in the Y-axis direction) of the detection resonating arms 3a and 3b, and thus the gyro element can be miniaturized. Moreover, the pair of detection resonating arms 3a and 3b are provided with recesses 58a and 58b. The recesses 58a and 58b in the embodiment are configured to be cut from the both surface sides, the front surfaces 3c and 3g and the rear surfaces 3d and 3f, as shown in FIGS. 2A and 2B, but may be configured to be cut from one surface, that is, from the front surfaces 3c and 3g or the rear surfaces 3d and 3f.

Further, as shown in FIGS. 1A and 1B, the gyro element 100 is provided with the adjusting resonating arms 4a and 4b as a pair of adjustment portions extending from the base portion 1 in a direction intersecting the crystal X-axis (electrical axis) of quartz crystal, so as to be parallel to the detection resonating arms 3a and 3b and interpose the detection resonating arms 3a and 3b therebetween. That is, the adjusting resonating arms 4a and 4b extend in the (+)Y-axis direction along the Y-axis, are located so as to interpose the detection resonating arms 3a and 3b on the inside thereof with a predetermined gap, and are provided so as to be parallel to the detection resonating arms 3a and 3b.

The adjusting resonating arms 4a and 4b are sometimes called tuning arms. Since the adjusting resonating arms 4a and 4b are provided, a leakage output can be adjusted. In other words, charge generated in the detection resonating arms 3a and 3b due to the leakage (transmission) of a drive vibration, a so-called vibration leakage output, can be canceled out by charge generated in the adjusting resonating arms 4a and 4b.

Moreover, the adjusting resonating arms 4a and 4b are formed such that the entire length thereof is shorter than the drive resonating arms 2a and 2b and the detection resonating arms 3a and 3b. Due to this, the vibration of the adjusting resonating arms 4a and 4b for adjusting the leakage output does not hinder the main vibration of the gyro element 100 caused by the drive resonating arms 2a and 2b and the detection resonating arms 3a and 3b. Therefore, the vibration characteristics of the gyro element 100 are stabilized, and at the same time, this form is advantageous in terms of miniaturization of the gyro element 100.

Further, substantially rectangular-shaped weight portions 54a and 54b that are wider (longer in length in the X-axis direction) than the adjusting resonating arms 4a and 4b are provided on the distal end side of the adjusting resonating arms 4a and 4b on the side opposite to one edge side of the base portion 1. In this manner, by providing the weight portions 54a and 54b at the tips of the adjusting resonating arms 4a and 4b, a change in mass can be made remarkable in the adjusting resonating arms 4a and 4b, and thus it is possible to further improve the effect of contributing to the higher sensitivity of the gyro element 100.

The center of the base portion 1 can be the center of gravity of the gyro element 100. The X-axis, the Y-axis, and the Z-axis are orthogonal to one another, and defined as passing through the center of gravity. The external form of the gyro element 100 can be line-symmetrical about an imaginary center line passing through the center of gravity in the Y-axis direction. Due to this, the external form of the gyro element 100 is well-balanced, so that the characteristics of the gyro element 100 are stabilized and detection sensitivity is improved, which is preferable. The shape of the external form of the gyro element 100 can be formed by etching (wet etching or dry etching) using a photolithographic technique. Multiple pieces of the gyro element 100 can be obtained from one quartz crystal wafer.

Next, one embodiment of an electrode arrangement of the gyro element 100 will be described with reference to FIGS. 2A and 2B. FIG. 2A shows cross-sections of the detection resonating arms 3a and 3b at the portion A-A shown in FIG. 1B; and FIG. 2B shows cross-sections of the drive resonating arms 2a and 2b at the portion B-B shown in FIG. 1B.

First, the detection electrodes formed on the detection resonating arms 3a and 3b and detecting a strain generated in the quartz crystal as the base material due to the vibration of the detection resonating arms 3a and 3b will be described. As shown in FIG. 1A, the detection resonating arms 3a and 3b are provided with the recesses 58a and 58b as described above. The recesses 58a and 58b in the embodiment are provided on both surface sides, the front surfaces 3c and 3g and the rear surfaces 3d and 3f.

The detection resonating arm 3a is provided with a first detection electrode 21a on the front surface 3c side and a second detection electrode 22b on the rear surface 3d side on the side surface 3h. The first detection electrode 21a and the second detection electrode 22b are divided by an electrode dividing portion 3m that is located at substantially the center of the detection resonating arm 3a in the thickness direction (Z-axis direction) thereof and provided along the extending direction (Y-axis direction) of the detection resonating arm 3a. Further, a second detection electrode 22a is provided on the inside surface of the recess 58a facing the first detection electrode 21a, and a first detection electrode 21b is provided on the inside surface of the recess 58a facing the second detection electrode 22b. Moreover, a second detection electrode 22a on the front surface 3c side and a first detection electrode 21b on the rear surface 3d side are provided on the side surface 3i on the side opposite to the side surface 3h. The second detection electrode 22a and the first detection electrode 21b are divided by an electrode dividing portion 3n that is located at substantially the center of the detection resonating arm 3a in the thickness direction thereof and provided along the extending direction of the detection resonating arm 3a. Further, a first detection electrode 21a is provided on the inside surface of the recess 58a facing the second detection electrode 22a, and a second detection electrode 22b is provided on the inside surface of the recess 58a facing the first detection electrode 21b.

Although not shown in the drawing, the first detection electrode 21a and the first detection electrode 21b are electrically connected by way of the tip and the like of the detection resonating arm 3a. Although not shown in the drawing, the second detection electrode 22a and the second detection electrode 22b are electrically connected by way of the tip and the like of the detection resonating arm 3a. The first detection electrodes 21a and 21b and the second detection electrodes 22a and 22b are extended to the vicinity of the tip of the detection resonating arm 3a. Moreover, the first detection electrodes 21a and 21b and the second detection electrodes 22a and 22b are electrically connected to external connection pads (not shown) via wirings (not shown). Moreover, the first detection electrodes 21a and 21b and the second detection electrodes 22a and 22b are also electrically connected to adjusting electrodes (not shown) formed on the adjusting resonating arm 4a (refer to FIGS. 1A and 1B).

Similarly, the detection resonating arm 3b is provided with a second detection electrode 31a on the front surface 3g side and a first detection electrode 32b on the rear surface 3f side on the side surface 3j. The second detection electrode 31a and the first detection electrode 32b are divided by an electrode dividing portion 3r that is located at substantially the center of the detection resonating arm 3b in the thickness direction (Z-axis direction) thereof and provided along the extending direction (Y-axis direction) of the detection resonating arm 3b. Further, a the first detection electrode 32a is provided on the inside surface of the recess 58b facing the second detection electrode 31a, and a second detection electrode 31b is provided on the inside surface of the recess 58b facing the first detection electrode 32b. Moreover, a first detection electrode 32a on the front surface 3g side and a second detection electrode 31b on the rear surface 3f side are provided on the side surface 3k on the side opposite to the side surface 3j. The first detection electrode 32a and the second detection electrode 31b are divided by an electrode dividing portion 3s that is located at substantially the center of the detection resonating arm 3b in the thickness direction thereof and provided along the extending direction of the detection resonating arm 3b. Further, a second detection electrode 31a is provided on the inside surface of the recess 58b facing the first detection electrode 32a, and a first detection electrode 32b is provided on the inside surface of the recess 58b facing the second detection electrode 31b.

Although not shown in the drawing, the second detection electrode 31a and the second detection electrode 31b are electrically connected by way of the tip and the like of the detection resonating arm 3b. Although not shown in the drawing, the first detection electrode 32a and the first detection electrode 32b are electrically connected by way of the tip and the like of the detection resonating arm 3b. The second detection electrodes 31a and 31b and the first detection electrodes 32a and 32b are extended to the vicinity of the tip of the detection resonating arm 3b. Moreover, the second detection electrodes 31a and 31b and the first detection electrodes 32a and 32b are electrically connected to external connection pads (not shown) via wirings (not shown). Moreover, the second detection electrodes 31a and 31b and the first detection electrodes 32a and 32b are also electrically connected to adjusting electrodes (not shown) formed on the adjusting resonating arm 4b (refer to FIGS. 1A and 1B).

In the detection resonating arm 3a, the first detection electrode 21a and the first detection electrode 21b are connected so as to be at the same potential, and the second detection electrode 22a and the second detection electrode 22b are connected so as to be at the same potential. Due to this, a strain generated by the vibration of the detection resonating arm 3a is detected by detecting a potential difference between the first detection electrodes 21a and 21b and the second detection electrodes 22a and 22b. Similarly, in the detection resonating arm 3b, the first detection electrode 32a and the first detection electrode 32b are connected so as to be at the same potential, and the second detection electrode 31a and the second detection electrode 31b are connected so as to be at the same potential. Due to this, a strain generated by the vibration of the detection resonating arm 3b is detected by detecting a potential difference between the first detection electrodes 32a and 32b and the second detection electrodes 31a and 31b.

Next, drive electrodes 11a, 11b, 11c, 12a, 12b, and 12c provided on the drive resonating arms 2a and 2b for driving the drive resonating arms 2a and 2b will be described. As shown in FIG. 2B, the drive electrode 11a and the drive electrode 11b are formed up to the weight portion 52a (refer to FIGS. 1A and 1B) on the front surface (one main surface) 2c and the rear surface (the other main surface) 2d, respectively, of the drive resonating arm 2a. Moreover, the drive electrode 12c is formed up to the weight portion 52a (refer to FIGS. 1A and 1B) of the drive resonating arm 2a on one side surface 2e and the other side surface 2f of the drive resonating arm 2a. Similarly, the drive electrode 12a and the drive electrode 12b are formed up to the weight portion 52b (refer to FIGS. 1A and 1B) on the front surface (one main surface) 2g and the rear surface (the other main surface) 2h, respectively, of the drive resonating arm 2b. Moreover, the drive electrode 11c is formed up to the weight portion 52b (refer to FIGS. 1A and 1B) of the drive resonating arm 2b on one side surface 2j and the other side surface 2k of the drive resonating arm 2b.

The drive electrodes 11a, 11b, 11c, 12a, 12b, and 12c formed on the drive resonating arms 2a and 2b are disposed such that the drive electrodes disposed to face each other via the drive resonating arms 2a and 2b are at the same potential. Although not shown in the drawing, a so-called tuning-fork vibration is excited in the drive resonating arms 2a and 2b by alternately providing a potential difference between the drive electrodes 11a, 11b, and 11c and the drive electrodes 12a, 12b, and 12c through a connection pad that is formed on a first fixing portion and to which the drive electrodes 11a, 11b, and 11c are connected and a connection pad that is formed on a second fixing portion and to which the drive electrodes 12a, 12b, and 12c are connected.

Next, electrodes provided on the adjusting resonating arms 4a and 4b will be described. Although not shown in the drawing, adjusting electrodes at the same potential are formed on the front and rear surfaces of the adjusting resonating arm 4a. Moreover, other adjusting electrodes at the same potential are formed on both side surfaces of the adjusting resonating arm 4a. Similarly, adjusting electrodes at the same potential are formed on the front and rear surfaces of the adjusting resonating arm 4b. Moreover, other adjusting electrodes at the same potential are formed on both side surfaces of the adjusting resonating arm 4b.

The configurations of the drive electrodes 11a, 11b, 11c, 12a, 12b, and 12c, the first detection electrodes 21a, 21b, 32a, and 32b, the second detection electrodes 22a, 22b, 31a, and 31b, and the adjusting electrodes are not particularly limited, and it is sufficient that the electrodes have conductivity and enable thin film formation. As a specific configuration, for example, the electrodes can be formed of a metal material such as gold (Au), a gold alloy, platinum (Pt), aluminum (Al), an aluminum alloy, silver (Ag), a silver alloy, chromium (Cr), a chromium alloy, copper (Cu), molybdenum (Mo), niobium (Nb), tungsten (W), iron (Fe), titanium (Ti), cobalt (Co), zinc (Zn), or zirconium (Zr), and a conductive material such as indium tin oxide (ITO).

Figure 3A:
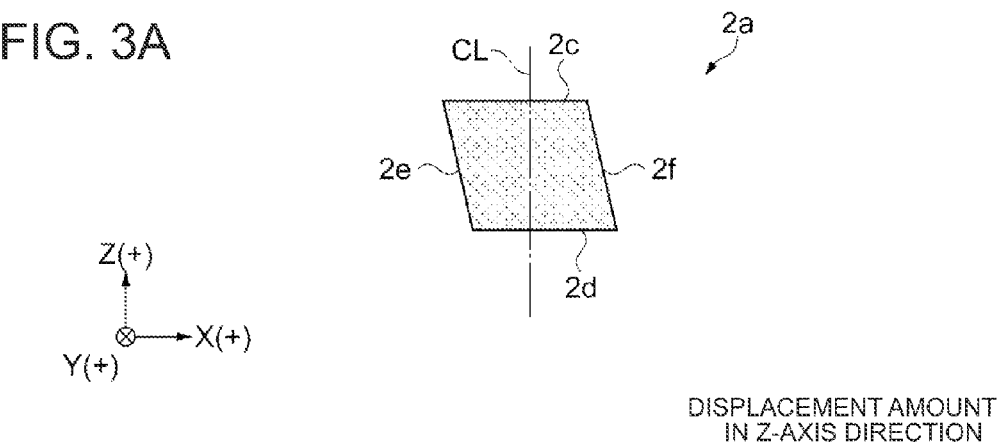
FIG. 3A is a cross-sectional view showing a cross-sectional shape of a drive portion.

Next, a leakage vibration of the gyro element 100 as a resonator element will be described using the drive resonating arm 2a. FIG. 3A is a cross-sectional view showing a cross-sectional shape of the drive portion; and FIGS. 3B and 3C are schematic cross-sectional views showing an oblique vibration of the drive portion.

Figure 3B:
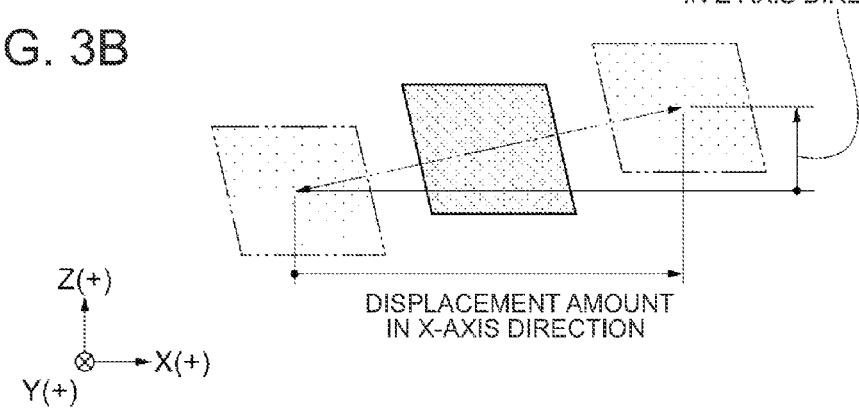
FIGS. 3B and 3C are schematic cross-sectional views showing an oblique vibration of the drive portion.
Figure 3C:
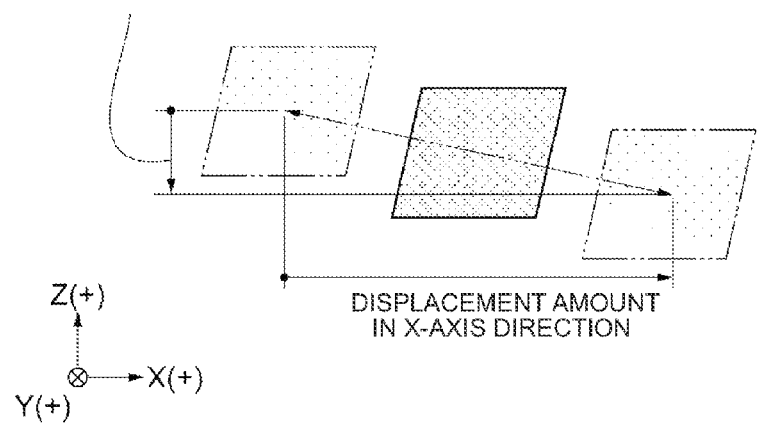

As shown in FIGS. 3A to 3C, when the drive resonating arm 2a is cut parallel to the XZ plane thereof, the cross-sectional shape may be asymmetrical about a center line CL due to processing variations in the manufacturing process when forming the external form of the gyro element 100. Specifically, the cross-section of the drive resonating arm 2a forms a parallelogram in which a first side formed by the front surface 2c and a second side formed by the rear surface 2d are shifted in opposite directions from each other along the X-axis direction.

In the case where an AC voltage is applied to the drive electrodes 11a and 11b and the drive electrodes 12c (refer to FIGS. 2A and 2B) of the drive resonating arm 2a to excite a flexural vibration in the drive resonating arm 2a (during a drive mode), when the position of the tip of the drive resonating arm 2a on the side opposite to the base portion 1 (refer to FIGS. 1A and 1B) is changed, this is referred to as "displacement". When the drive resonating arm 2a having the shape shown in FIG. 3A is caused to flexurally vibrate, the drive resonating arm 2a generates an oblique vibration including displacement in the X-axis direction (in-plane direction) caused by a primary vibration and displacement in the Z-axis direction (out-of-plane direction) caused by a leakage vibration. The oblique vibration has two vibration forms. A first vibration form shown in FIG. 3B is a form in which when the drive resonating arm 2a swings in the +X-axis direction, the leakage vibration is generated in the +Z-axis direction, while when the drive resonating arm 2a swings in the −X-axis direction, the leakage vibration is generated in the −Z-axis direction. A second vibration form shown in FIG. 3C is a vibration form in which when the drive resonating arm 2a swings in the +X-axis direction, the leakage vibration is generated in the −Z-axis direction, while when the drive resonating arm. 2a swings in the −X-axis direction, the leakage vibration is generated in the +Z-axis direction.

Because of the displacement in the out-of-plane direction caused by the leakage vibration, also in a state where no angular velocity is applied to the gyro element 100 (where no Coriolis force is generated in the drive resonating arms 2a and 2b as the drive portions), the detection resonating arms 3a and 3b as the detection portions detect charge due to flexural vibration in the out-of-plane direction caused by resonance with the leakage vibration (displacement) of the drive portions in the out-of-plane direction.

Figure 4:
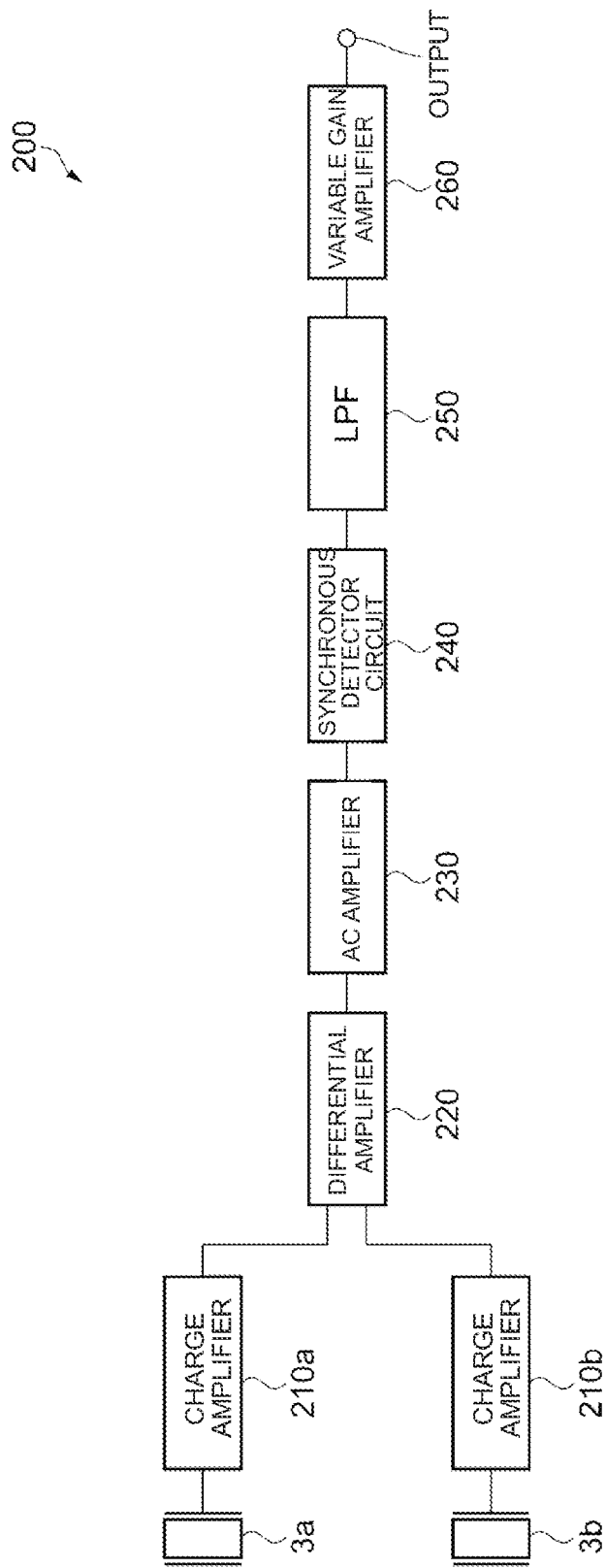
FIG. 4 shows, as one example, a detection circuit that processes output signals from the gyro element.

Next, a detection circuit 200 for an angular velocity applied to the gyro element 100 will be described with reference to FIG. 4. FIG. 4 shows, as one example, the detection circuit that processes output signals from the gyro element.

The detection circuit 200 is configured to include the detection resonating arms 3a and 3b as the detection portions, charge amplifiers 210a and 210b, a differential amplifier 220, an AC amplifier 230, a synchronous detector circuit 240, a low-pass filter (LPF) 250, and a variable gain amplifier 260.

When an angular velocity is applied to the gyro element 100, a Coriolis force is generated in the drive resonating arms 2a and 2b, and output signals of different polarities in response to the angular velocity are output to the detection resonating arm 3a and the detection resonating arm 3b. The output signals output from the detection resonating arms 3a and 3b are amplified by the charge amplifiers 210a and 210b, respectively, and then output to the differential amplifier 220.

The differential amplifier 220 outputs a differentially amplified signal of the output signals from the detection resonating arm 3a and the detection resonating arm 3b to the synchronous detector circuit 240 via the AC amplifier 230. In the synchronous detector circuit 240, phase detection is performed on the differentially amplified signal input from the differential amplifier 220 via the AC amplifier 230 using an output signal from a drive circuit (not shown) as a reference. An output signal from the synchronous detector circuit 240 is smoothed through the LPF 250, amplified by the variable gain amplifier 260, and then output. Due to this, the angular velocity $\omega$ about the Y-axis can be obtained as a numerical value.

Next, output signals output from the gyro element will be described with reference to FIGS. 5A to 5D.

Figure 5A:
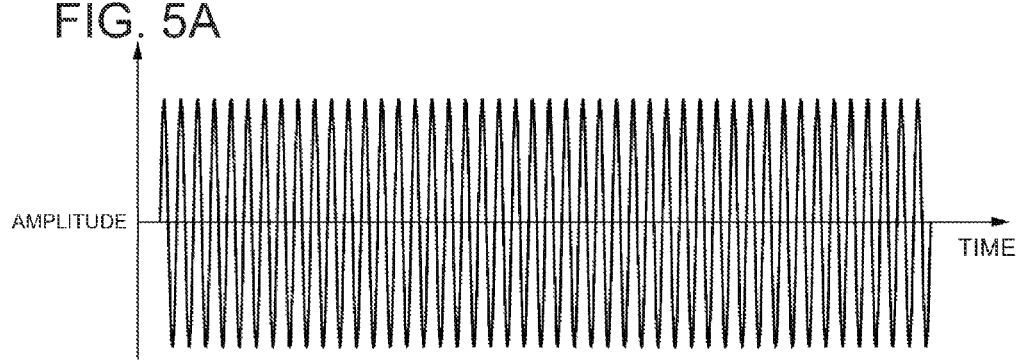
FIG. 5A schematically shows a drive vibration of a drive resonating arm.
Figure 5B:
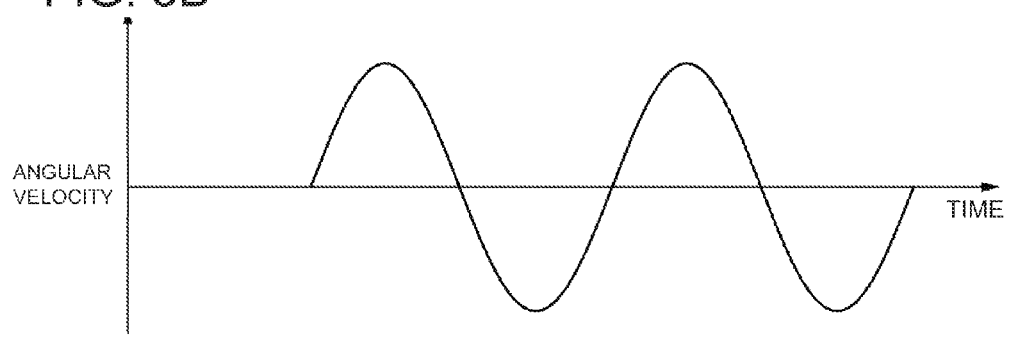
FIG. 5B schematically shows an angular velocity applied to the gyro element.
Figure 5C:
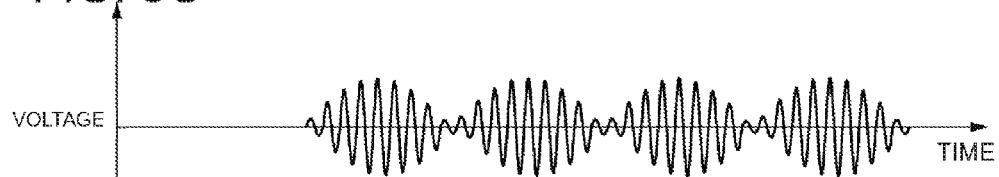
FIG. 5C schematically shows an output signal in the absence of a leakage vibration.
Figure 5D:
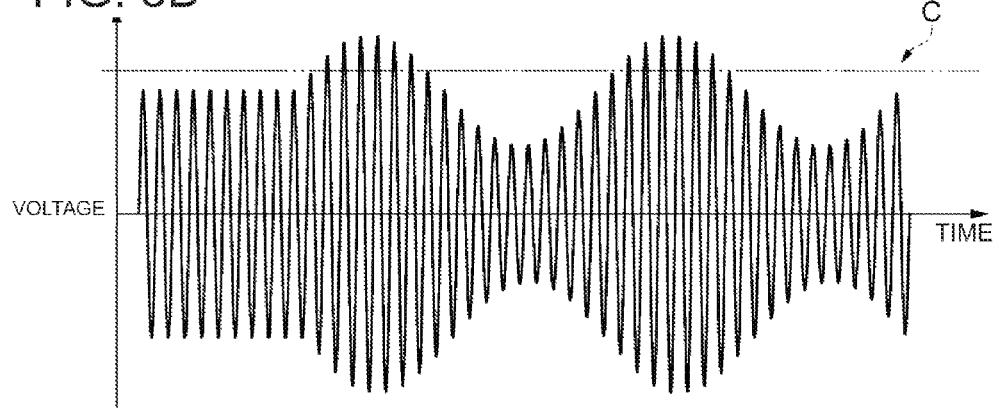
FIG. 5D schematically shows an output signal in the presence of the leakage vibration.

FIG. 5A shows a drive vibration of the drive resonating arms 2a and 2b; FIG. 5B schematically shows an angular velocity applied to the gyro element 100; FIG. 5C schematically shows an output signal in the absence of the leakage vibration; and FIG. 5D schematically shows an output signal in the presence of the leakage vibration. The horizontal axis in FIGS. 5A to 5D represents the time; the vertical axis in FIG. 5A represents the amplitude; the vertical axis in FIG. 5B represents the angular velocity; and the vertical axis in FIGS. 5C and 5D represents an output voltage.

When an AC voltage is applied to the drive electrodes 11a and 11b and the drive electrodes 12c (refer to FIGS. 2A and 2B) of the drive resonating arm 2a and the drive electrodes 12a and 12b and the drive electrodes 11c of the drive resonating arm 2b, the drive resonating arms 2a and 2b generate a drive vibration in which the drive resonating arms 2a and 2b vibrate in the X-axis direction with a constant amplitude at a predetermined frequency. FIG. 5A shows a schematic waveform of the drive vibration.

FIG. 5B shows the angular velocity applied about the Y-axis of the gyro element 100.

FIG. 5C shows the output signal output from the detection resonating arm 3a or the detection resonating arm 3b in the absence of the displacement in the Z-axis direction caused by the leakage vibration. As shown in FIG. 5C, in the absence of the leakage vibration, a voltage is not output in areas where the angular velocity is not applied. In areas where the angular velocity is applied, a voltage obtained by superimposing the waveform of the drive vibration on the angular velocity is output.

FIG. 5D shows the output signal output from the detection resonating arm 3a or the detection resonating arm 3b in the presence of the displacement in the Z-axis direction caused by the leakage vibration. As shown in FIG. 5D, in the presence of the leakage vibration, a constant voltage is generated by the leakage vibration also in areas where the angular velocity is not applied. In areas where the angular velocity is applied, a voltage obtained by superimposing the voltage output in the absence of the leakage vibration shown in FIG. 5C on the voltage generated by the leakage vibration is output.

An imaginary line C in FIG. 5D shows an allowable input value of the charge amplifiers 210a and 210b shown in FIG. 4. As the leakage vibration becomes strong, the output voltage in the areas where the angular velocity is not applied is increased. When the voltage output by the angular velocity is superimposed on the increased output voltage and the superimposed voltage exceeds the allowable input value of the charge amplifiers 210a and 210b, the charge amplifiers 210a and 210b are brought into saturation and thus cannot detect the angular velocity applied to the gyro element 100. Hence, the gyro element 100 having a large oblique vibration needs to be individually trimmed to suppress the leakage vibration (displacement in the Z-axis direction).

Figures 6, 7:
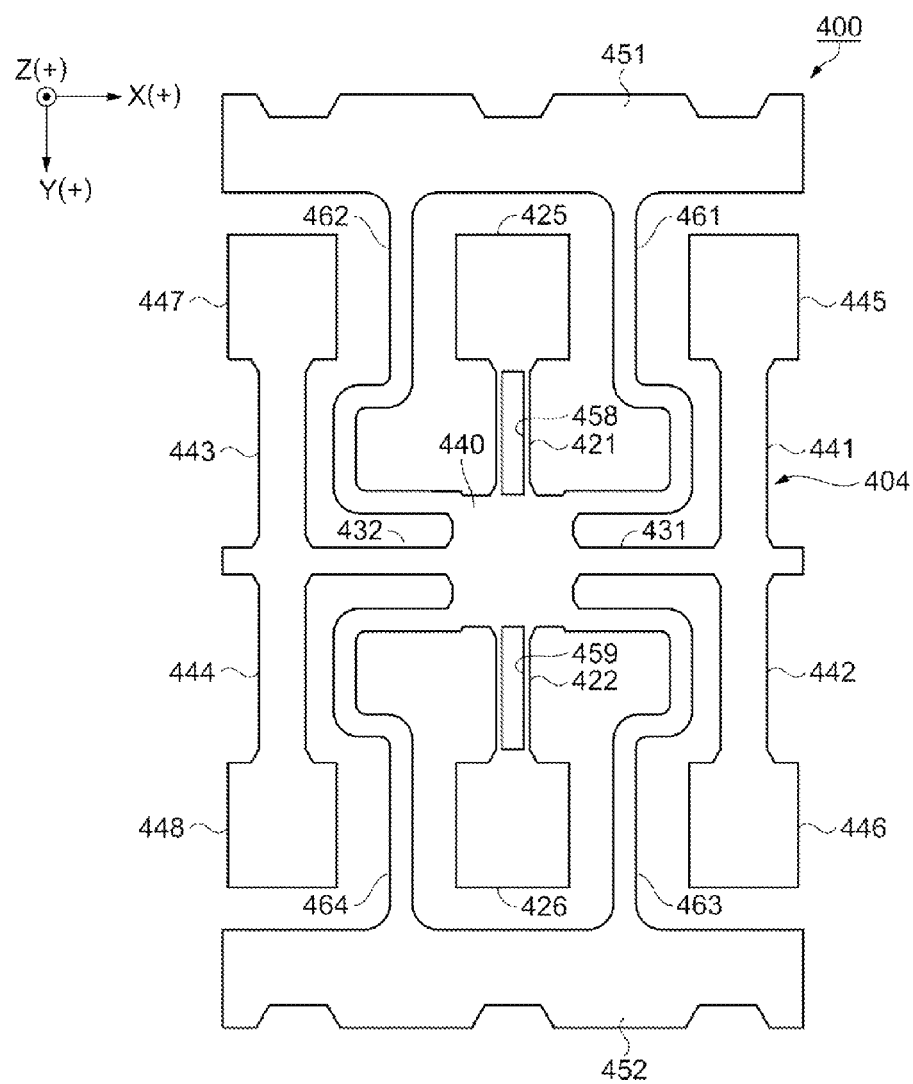
FIG. 6 shows the relationship between charge output from the gyro element and the detection of an angular velocity.
FIG. 7 schematically shows a double-T type gyro element as one example of a resonator element according to Embodiment 2.

FIG. 6 shows the relationship between charge output from the gyro element 100 and the detection of an angular velocity. The charge amount ratio described in FIG. 6 represents, by percentage (%), the value obtained by dividing the amount of charge detected in the detection resonating arms 3a and 3b as the detection portions, in a state where no Coriolis force is generated in the drive resonating arms 2a and 2b (refer to FIGS. 1A and 1B), in other words, in a state where no angular velocity is applied about the Y-axis of the gyro element 100, by the amount of charge generated in the drive resonating arms 2a and 2b when driving the drive resonating arms 2a and 2b as the drive portions. The detection of angular velocity shows whether or not, when an angular velocity is applied about the Y-axis of the gyro element 100, the angular velocity is detected without the saturation of the charge amplifiers 210a and 210b due to the output signals from the detection resonating arms 3a and 3b. The charge generated in the drive resonating arms 2a and 2b can be detected by providing detection electrodes (not shown) on the drive resonating arms 2a and 2b.

As shown in FIG. 6, the angular velocity can be detected without the saturation of the charge amplifiers 210a and 210b by using the gyro element 100 having a charge amount ratio of 0.1% or less in the detection circuit 200 shown in FIG. 4. It was found that as a resonator element (the gyro element 100) used for a gyro sensor, a charge ratio of up to 0.1% is allowable, and there is no need to completely eliminate the leakage vibration of the drive resonating arms 2a and 2b (to reduce the charge ratio to 0%). Due to this, it is unnecessary that the displacement in the out-of-plane direction (Z-axis direction) caused by the leakage vibration of the drive resonating arms 2a and 2b as the drive portions should be suppressed more than necessary, the yield of the gyro element 100 can be improved, and the load required for the trimming of the gyro element 100 can be reduced.

In the description of the gyro element 100 according to Embodiment 1, an example has been used, in which the pair of detection resonating arms 3a and 3b and the pair of adjusting resonating arms 4a and 4b interposing the detection resonating arms 3a and 3b therebetween are provided at one edge of the base portion 1, and the pair of drive resonating arms 2a and 2b are provided at the other edge. However, the invention is not limited to this configuration. For example, the invention may employ a form in which the drive resonating arms and the adjusting resonating arms are extended in the same direction from the same edge of the base portion.

Moreover, although an example of using, as the base material, quartz crystal that is a piezoelectric material has been described in the embodiment, the invention is not limited to this example. For example, a so-called piezoelectric thin-film type gyro element may be employed, in which the external form of the gyro element is formed using a material containing silicon as a main component for the base material, and a piezoelectric body interposed between drive electrodes or detection electrodes as the drive portions or the detection portions is included.

As has been described above, according to the gyro element 100 as a resonator element according to Embodiment 1, the following advantageous effects can be obtained.

By setting the charge detected in the detection resonating arms 3a and 3b of the gyro element 100 in the state where no Coriolis force is generated to be greater than 0% and equal to or less than 0.1% of the charge generated in the drive resonating arms 2a and 2b when driving the drive resonating arms 2a and 2b, the gyro element 100 can be used as a resonator element of a gyro sensor. Due to this, it is unnecessary that the displacement in the out-of-plane direction (Z-axis direction) caused by the leakage vibration of the drive resonating arms 2a and 2b as the drive portions should be suppressed more than necessary, the yield of the gyro element 100 can be improved, and the load required for the trimming of the gyro element 100 can be reduced. Hence, it is possible to provide the gyro element 100 with reduced manufacturing cost.

Embodiment 2

Gyro Element-2

Next, a gyro element 400 as a resonator element according to Embodiment 2 will be described with reference to FIG. 7.

FIG. 7 schematically shows a schematic configuration of the gyro element according to Embodiment 2, and is a plan view of the gyro element as viewed from the +side of the Z-axis direction. The gyro element 400 is provided with a detection signal electrode, a detection signal wiring, a detection signal terminal, a detection ground electrode, a detection ground wiring, a detection ground terminal, a drive signal electrode, a drive signal wiring, a drive signal terminal, a drive ground electrode, a drive ground wiring, a drive ground terminal, and the like, all of which are omitted in FIG. 7.

The gyro element 400 according to Embodiment 2 is an "out-of-plane axis detection-type" sensor element that detects an angular velocity about the Z-axis. Although not shown in the drawing, the gyro element 400 includes a base material, and pluralities of electrodes, wirings, and terminals provided on the front surface of the base material. The gyro element 400 can be composed of a piezoelectric material such as quartz crystal, lithium tantalate, or lithium niobate, and among these, the gyro element 400 is preferably composed of quartz crystal. Due to this, it is possible to obtain the gyro element 400 capable of providing excellent vibration characteristics (frequency characteristics).

The gyro element 400 includes a resonating body 404 having a so-called double-T shape, a first support portion 451 and a second support portion 452 that support the resonating body 404, and a first beam 461, a second beam 462, a third beam 463, and a fourth beam 464 that couple the resonating body 404 with the first support portion 451 and the second support portion 452.

The resonating body 404 extends on the XY plane, and has a thickness in the Z-axis direction. The resonating body 404 includes a base portion 440 located at the center, a first coupling arm 431 and a second coupling arm 432 as coupling portions extending from the base portion 440 on both sides along the X-axis direction, a first detection resonating arm 421 and a second detection resonating arm 422 as detection portions extending from the base portion 440 on both sides along the Y-axis direction, a first drive resonating arm 441 and a second drive resonating arm 442 as drive portions extending from the tip of the first coupling arm 431 on both sides along the Y-axis direction, and a third drive resonating arm 443 and a fourth drive resonating arm 444 as drive portions extending from the tip of the second coupling arm 432 on both sides along the Y-axis direction. Substantially quadrilateral weight portions (hammerheads) 425, 426, 445, 446, 447, and 448 each having a larger width than that on the base end side are provided on the distal end side of the first and second detection resonating arms 421 and 422 and the first, second, third, and fourth drive resonating arms 441, 442, 443, and 444 on the side opposite to one edge side of the base portion 440. By providing the weight portions 425, 426, 445, 446, 447, and 448, the detection sensitivity of the gyro element 400 for angular velocity is improved.

The first detection resonating arm 421 is provided with bottomed recesses 458, and the second detection resonating arm 422 is provided with bottomed recesses 459. The recesses 458 and 459 are cut from both surface sides, the front surface and the rear surface. The recess may be configured to be cut from any one of surfaces, that is, the front surface or the rear surface.

Moreover, the first and second support portions 451 and 452 extend along the X-axis direction. Between the first and second support portions 451 and 452, the resonating body 404 is located. In other words, the first and second support portions 451 and 452 are disposed so as to face each other along the Y-axis direction via the resonating body 404. The first support portion 451 is coupled with the base portion 440 via the first beam 461 and the second beam 462. The second support portion 452 is coupled with the base portion 440 via the third beam 463 and the fourth beam 464.

The first beam 461 passes between the first detection resonating arm 421 and the first drive resonating arm 441 to couple the first support portion 451 with the base portion 440. The second beam 462 passes between the first detection resonating arm 421 and the third drive resonating arm 443 to couple the first support portion 451 with the base portion 440. The third beam 463 passes between the second detection resonating arm 422 and the second drive resonating arm 442 to couple the second support portion 452 with the base portion 440. The fourth beam 464 passes between the second detection resonating arm 422 and the fourth drive resonating arm 444 to couple the second support portion 452 with the base portion 440.

Each of the first beam 461 to the fourth beam 464 is formed in an elongated shape with a serpentine portion that extends along the Y-axis direction while reciprocating along the X-axis direction, and therefore has elasticity in all directions. Therefore, even when an impact is applied from the outside, detection noises caused by this impact can be reduced or suppressed because each of the beams 461, 462, 463, and 464 has a function of absorbing the impact.

The gyro element 400 having the configuration described above detects the angular velocity $\omega$ about the Z-axis as follows. In the drive vibration of the gyro element 400, when an electric field is generated between the drive signal electrode (not shown) and the drive ground electrode (not shown) in a state where no angular velocity $\omega$ is applied, the drive resonating arms 441, 442, 443, and 444 perform a flexural vibration in the X-axis direction. At this time, the first and second drive resonating arms 441 and 442 and the third and fourth drive resonating arms 443 and 444 perform vibrations in a plane-symmetrical manner with respect to the YZ plane passing through the central point (center of gravity). Therefore, the base portion 440, the first and second coupling arms 431 and 432, and the first and second detection resonating arms 421 and 422 hardly vibrate.

When the angular velocity $\omega$ is applied to the gyro element 400 about the Z-axis in the state of performing the drive vibration, a Coriolis force in the Y-axis direction acts on the drive resonating arms 441, 442, 443, and 444 and the coupling arms 431 and 432, and in response to the vibration in the Y-axis direction, a detection vibration in the X-axis direction is excited. Then, the strain of the detection resonating arms 421 and 422 generated by the vibration is detected as a detection signal, so that the angular velocity $\omega$ is obtained.

Similarly to the gyro element 100 of Embodiment 1 described above, by setting the charge detected in the first detection resonating arm 421 and the second detection resonating arm 422 of the gyro element 400 in the state where no Coriolis force is generated to be greater than 0% and equal to or less than 0.1% of the charge generated in the drive resonating arms 441, 442, 443, and 444 when driving the drive resonating arms 441, 442, 443, and 444, the gyro element 400 can be used as a resonator element of a gyro sensor. Due to this, it is unnecessary that the displacement in the out-of-plane direction (Z-axis direction) caused by the leakage vibration of the drive resonating arms 441, 442, 443, and 444 as the drive portions should be suppressed more than necessary, the yield of the gyro element 400 can be improved, and the load required for the trimming of the gyro element 400 can be reduced. Hence, it is possible to provide the gyro element 400 with reduced manufacturing cost.

In the gyro element 400 according to Embodiment 3, a configuration in which the recesses 458 and 459 are provided in the first detection resonating arm 421 and the second detection resonating arm 422 has been described. However, the invention is not limited to this configuration, and a configuration in which the recesses 458 and 459 are not provided may be employed.

Embodiment 3

Gyro Element-3

Figure 8:
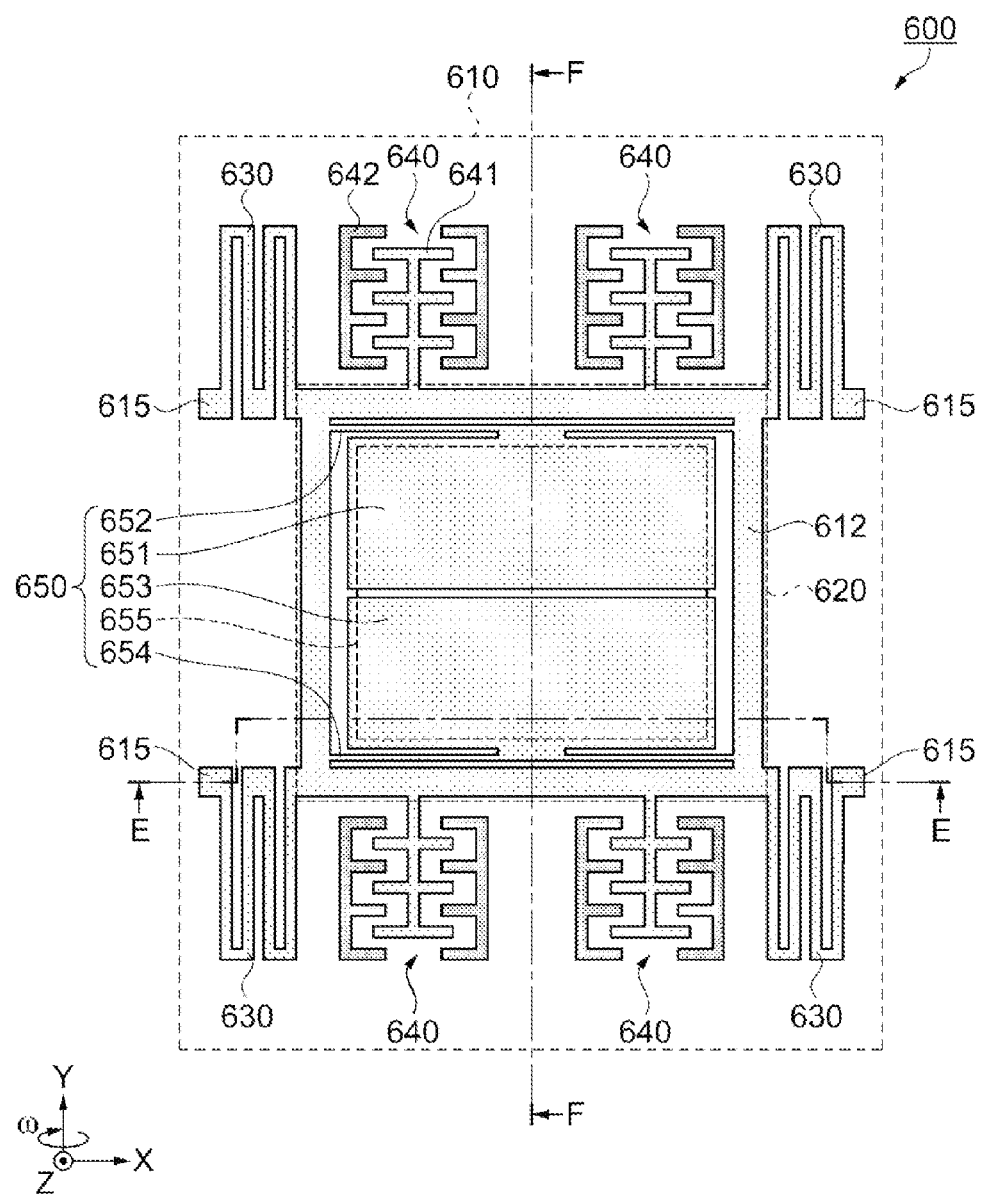
FIG. 8 is a plan view schematically showing a gyro element as one example of a resonator element according to Embodiment 3.

Next, a gyro element 600 will be described with reference to FIG. 8. FIG. 8 is a plan view schematically showing the gyro element 600 as one example of a resonator element according to Embodiment 3. FIG. 9A is a cross-sectional view taken along the line E-E in FIG. 8; and FIG. 9B is a cross-sectional view taken along the line F-F in FIG. 8.

As shown in FIGS. 8 to 9B, the gyro element 600 includes a base body 610, a resonating body 620, elastic support bodies 630, and drive portions 640. In the gyro element 600, the resonating body 620 is provided via a recess 614 provided in the base body 610 and a gap. The resonating body 620 is supported via the elastic support bodies 630 to a fixing portion 617 provided on a first surface 611 (on the base body 610) of the base body 610.

The gyro element 600 is a gyro element (electrostatic capacitive MEMS gyro element) that detects an angular velocity about the Y-axis in a detection portion 650 of the resonating body 620.

In FIG. 8, the base body 610 is shown in a see-through manner for convenience sake. Viewing from the normal direction of the first surface 611 (refer to FIGS. 9A and 9B) as a base surface of the base body 610 on which the resonating body 620 is provided, that is, viewing from above the resonating body 620 supported to the base body 610 is hereinafter referred to as "plan view".

As shown in FIGS. 9A and 9B, the base body 610 includes the first surface 611 and a second surface 611b on the side opposite to the first surface 611. The recess 614 is provided in the first surface 611. The resonating body 620 (the detection portion 650 and a support portion 612), the elastic support bodies 630, and the drive portions 640 (driving movable electrode portions 641 and driving fixed electrode portions 642) are provided above the recess 614 via the gap. Due to the recess 614, the resonating body 620, the elastic support bodies 630, and a portion (the driving movable electrode portions 641) of the drive portion 640 can move in a desired direction without being obstructed by the base body 610. As the material of the base body 610, for example, glass or silicon can be used.

Although the planar shape (shape as viewed from the Z-axis direction) of the recess 614 of the embodiment is a rectangle, the planar shape is not particularly limited. The recess 614 is formed by, for example, a photolithographic technique and an etching technique.

The base body 610 includes the fixing portion 617 appropriately provided on the first surface 611 according to the form of the resonating body 620 as shown in FIGS. 9A and 9B. One end 615 of each of the elastic support bodies 630 supporting the resonating body 620 is fixed (bonded) to the fixing portion 617, so that the fixing portion 617 is a portion that supports the resonating body 620 via the elastic support bodies 630.

As shown in FIGS. 8 to 9B, the one ends 615 (the fixing portion 617) of the elastic support bodies 630 may be disposed so as to interpose the resonating body 620 therebetween in the X-axis direction. Moreover, the one ends 615 of the elastic support bodies 630 may be disposed so as to interpose the resonating body 620 therebetween in the Y-axis direction. That is, the one end 615 of the elastic support body 630 may be provided at two or four places.

A fixing (bonding) method of the first surface 611 (the base body 610) of the fixing portion 617 to the elastic support bodies 630, the driving fixed electrode portions 642, and the like is not particularly limited. When, however, the material of the base body 610 is glass and the material of the resonating body 620 and the like is silicon for example, anodic bonding can be applied.

The resonating body 620 is supported via the elastic support bodies 630 to the first surface 611 (on the base body 610) of the base body 610. The resonating body 620 includes the detection portion 650 and the support portion 612 connected with the detection portion 650. The material of the resonating body 620 is, for example, silicon doped with an impurity such as phosphorus or boron to provide conductivity. The resonating body 620 is formed by, for example, processing a silicon substrate (not shown) by a photolithographic technique and an etching technique.

The resonating body 620 is supported by the one ends 615 of the elastic support bodies 630 to the fixing portion 617 via the elastic support bodies 630, and is disposed spaced from the base body 610. More specifically, the resonating body 620 is provided via the gap above the recess 614 formed in the base body 610. The resonating body 620 includes the support portion 612 having a frame-like shape surrounding the detection portion 650 described later. The resonating body 620 may have a shape symmetrical about a not-shown center line (straight line along the X-axis or the Y-axis).

The elastic support body 630 is configured so as to be able to displace the resonating body 620 in the X-axis direction. More specifically, the elastic support body 630 extends from the one end 615 of the elastic support body 630 to the resonating body 620 in a direction along the X-axis, and has a shape extending in the X-axis direction while reciprocating in the Y-axis direction. The one end 615 of the elastic support body 630 is bonded (fixed) to the fixing portion 617 (the first surface 611 of the base body 610). Moreover, the other end of the elastic support body 630 is connected to the support portion 612 of the resonating body 620. In the embodiment, four elastic support bodies 630 are provided so as to interpose the resonating body 620 in the X-axis direction.

The material of the elastic support body 630 is, for example, silicon doped with an impurity such as phosphorus or boron to provide conductivity. The elastic support body 630 is formed integrally with the resonating body 620 by, for example, processing a silicon substrate (not shown) by a photolithographic technique and an etching technique.

The detection portion 650 is provided on the inside of the support portion 612 of the resonating body 620 (the central side of the resonating body 620) in the plan view. In other words, the detection portion 650 is provided on the side opposite to the arrangement side of the drive portion 640, described later, with respect to the support portion 612.

The detection portion 650 includes a first flap plate 651 and a second flap plate 653 as movable electrodes, a first beam portion 652 connected with the first flap plate 651, a second beam portion 654 connected with the second flap plate 653, and a detecting fixed electrode 655. For the first flap plate 651 and the second flap plate 653, silicon is doped with an impurity such as phosphorus or boron to provide conductivity as described above.

The first flap plate 651 is connected with the first beam portion 652 at a connection portion of the first beam portion 652 located at the central portion thereof in the X-axis direction. The first beam portion 652 is provided along one extending portion of the support portion 612 along the X-axis, and both ends of the first beam portion 652 are connected to two extending portions of the support portion 612 extending along the Y-axis and facing each other. An edge of the first flap plate 651 on the side opposite to an edge thereof connected with the first beam portion 652 is a free edge. The first flap plate 651 can swing in the Z-axis direction with the first beam portion 652 as the axis of rotation.

The second flap plate 653 is connected with the second beam portion 654 at a connection portion of the second beam portion 654 located at the central portion thereof in the X-axis direction. The second beam portion 654 is provided along the other extending portion of the support portion 612 located on the side (the −Y-axis direction) opposite to the one extending portion of the support portion 612 located on the first beam portion 652 side (the +Y-axis direction), with the detection portion 650 interposed between the extending portions.

Both ends of the second beam portion 654 are connected to the inside of two extending portions of the support portion 612 facing each other along the Y-axis direction. An edge of the second flap plate 653 on the side opposite to an edge thereof connected with the second beam portion 654 is a free edge. The second flap plate 653 can swing in the Z-axis direction with the second beam portion 654 as the axis of rotation. The respective free edges of the first flap plate 651 and the second flap plate 653 are disposed so as to be directed inward in the Y-axis direction, and are provided so as to face each other with a gap.

The detecting fixed electrode 655 faces the first flap plate 651 and the second flap plate 653 with a gap, and is provided so as to substantially overlap areas where the first flap plate 651 and the second flap plate 653 are disposed in the plan view. The detecting fixed electrode 655 is provided on a bottom surface 613 of the recess 614 provided in the first surface 611 of the base body 610.

The detecting fixed electrode 655 provided on the bottom surface 613 of the recess 614 of the base body 610 is formed by depositing a transparent electrode material such as ITO (indium tin oxide) or ZnO (zinc oxide) by a sputtering method or the like, and patterning the deposited material by a photolithography method, an etching method, or the like. The detecting fixed electrode 655 is not limited to the transparent electrode material, and a metal material such as gold (Au), a gold alloy, platinum (Pt), aluminum (Al), an aluminum alloy, silver (Ag), a silver alloy, chromium (Cr), a chromium alloy, copper (Cu), molybdenum (Mo), niobium (Nb), tungsten (W), iron (Fe), titanium (Ti), cobalt (Co), zinc (Zn), or zirconium (Zr) can be used. Moreover, when the base body 610 is a semiconductor material such as silicon, an insulating layer is preferably included between the base body 610 and the driving fixed electrode portion 642. As the insulating layer, for example, $SiO_2$ (silicon oxide), AlN (aluminum nitride), SiN (silicon nitride), or the like can be used.

The drive portion 640 has a mechanism capable of exciting the resonating body 620. The configuration and number of the drive portions 640 are not particularly limited as long as the drive portion 640 can excite the resonating body 620. For example, the drive portion 640 may be directly provided to the resonating body 620. As shown in FIG. 8, the drive portion 640 includes the driving movable electrode portion 641 connected to the resonating body 620 (the support portion 612) on the outside thereof in the Y-axis direction, and the driving fixed electrode portions 642 disposed on the base body 610 to face the driving movable electrode portion 641 with a predetermined distance. The drive portion 640 may not be directly connected to the resonating body 620, but may have a mechanism to excite the resonating body 620 with an electrostatic force or the like and be disposed outside the resonating body 620.

A plurality of driving movable electrode portions 641 may be provided to be connected to the resonating body 620. In the illustrated example, the driving movable electrode portion 641 is provided to be a comb-tooth-shaped electrode having a trunk portion extending in the +Y-axis direction (or −Y-axis direction) from the resonating body 620 and a plurality of branch portions extending in the +X-axis direction and the −X-axis direction from the trunk portion.

The driving fixed electrode portion 642 is disposed outside the driving movable electrode portion 641. The driving fixed electrode portion 642 is bonded (fixed) to the first surface 611 of the base body 610. In the illustrated example, a plurality of driving fixed electrode portions 642 are provided and disposed to face each other via the driving movable electrode portion 641. When the driving movable electrode portion 641 has a comb-tooth shape, the driving fixed electrode portion 642 may have the shape of a comb-tooth-shaped electrode corresponding to the driving movable electrode portion 641.

The material of the drive portion 640 is, for example, silicon doped with an impurity such as phosphorus or boron to provide conductivity. The drive portion 640 is formed integrally with the resonating body 620 by, for example, processing a silicon substrate (not shown) by a photolithographic technique and an etching technique.

The gyro element 600 having the configuration described above detects the angular velocity ω about the Y-axis as follows.

In the drive vibration of the gyro element 600, the resonating body 620 performs a reciprocating vibration (motion) along the X-axis, in the state where no angular velocity ω is applied, with an electrostatic force generated between the driving fixed electrode portion 642 and the driving movable electrode portion 641 in the drive portion 640 connected to the support portion 612. More specifically, an alternating voltage is applied between the driving fixed electrode portion 642 and the driving movable electrode portion 641. Due to this, the resonating body 620 including the first flap plate 651 and the second flap plate 653 can be caused to vibrate along the X-axis at a predetermined frequency.

When the gyro element 600 is subjected to the angular velocity ω about the Y-axis in the state where the gyro element 600 performs the drive vibration, a Coriolis force in the Z-axis direction is generated, and thus the resonating body 620 (the first flap plate 651 and the second flap plate 653) vibrates in the Z-axis direction. By detecting a change in capacitance caused by the vibration in the Z-axis direction, the angular velocity can be calculated. Specifically, when the first flap plate 651 and the second flap plate 653 vibrate (swing) in the Z-axis direction in a state where a DC voltage is applied to the first flap plate 651 and the second flap plate 653, a distance between the detecting fixed electrode 655, and the first flap plate 651 and the second flap plate 653 is changed, so that an electrostatic capacitance between the detecting fixed electrode 655, and the first flap plate 651 and the second flap plate 653 is changed. By detecting the change in the capacitance as a change in the current of the detecting fixed electrode 655, the angular velocity ω can be obtained.

Next, a leakage vibration of the gyro element 600 as a resonator element will be described.

A silicon structure of the gyro element 600, which includes the resonating body 620, has a cross-sectional shape that has to be originally a square or rectangle, but the cross-sectional shape is sometimes formed in a parallelogram or the like, similarly to that in FIG. 3A, because of, for example, processing errors generated in a dry etching process. In this state, when a drive vibration is excited by applying an AC voltage to the drive portion 640, the drive portion 640 generates an oblique vibration including displacement in the X-axis direction (in-plane direction) caused by a primary vibration and displacement in the Z-axis direction (out-of-plane direction) caused by a leakage vibration. When this oblique vibration transmits to the detection portion 650 and the detection portion 650 vibrates in the Z-axis direction as a vibration direction in which an angular velocity is detected, the detection portion 650 detects an angular velocity even though no angular velocity is generated, or an error is generated in an angular velocity detected.

Similarly to the gyro element 100 of Embodiment 1 described above, by setting the charge detected in the detection portion 650 of the gyro element 600 in the state where no Coriolis force is generated to be greater than 0% and equal to or less than 0.1% of the charge generated in the drive portions 640 when driving the drive portions 640, the gyro element 600 can be used as a resonator element of a gyro sensor. Due to this, it is unnecessary that the displacement in the out-of-plane direction (Z-axis direction) caused by the leakage vibration of the drive portions 640 should be suppressed more than necessary, the yield of the gyro element 600 can be improved, and the load required for the trimming of the gyro element 600 can be reduced. Hence, it is possible to provide the gyro element 600 with reduced manufacturing cost.

Gyro Sensor as Electronic Device

Figure 10:
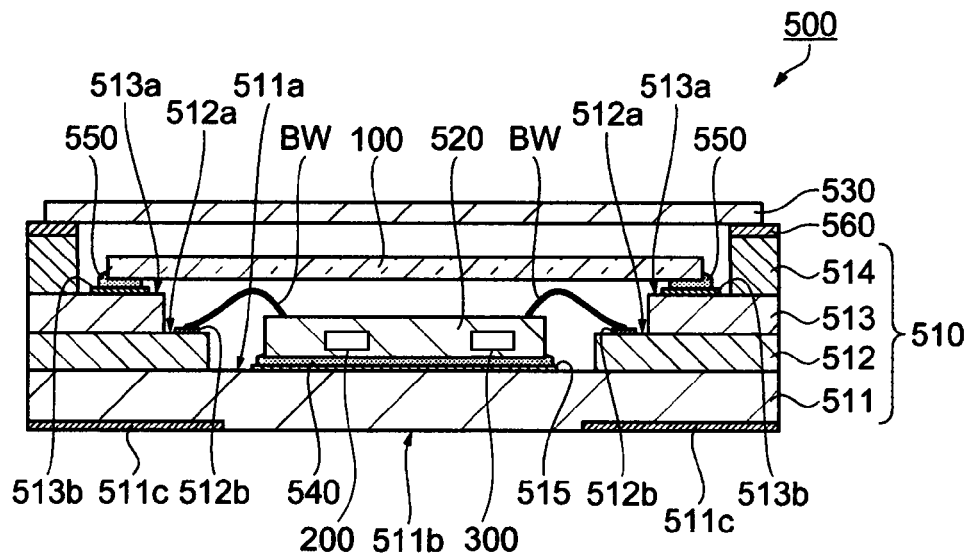
FIG. 10 is a front cross-sectional view showing a schematic configuration of a gyro sensor as one example of an electronic device according to the invention.

Next, a gyro sensor 500 as an electronic device including the gyro element 100 according to Embodiment 1 will be described with reference to FIG. 10. FIG. 10 is a front cross-sectional view showing a schematic configuration of the gyro sensor as one example of the electronic device.

As shown in FIG. 10, the gyro sensor 500 accommodates the gyro element 100 and a semiconductor device 520 as an electronic component in a recess of a package 510. An opening of the package 510 is hermetically sealed by a lid 530 to keep the interior of the gyro sensor 500 airtight. The package 510 is formed by stacking and fixing a plate-like first substrate 511, and frame-like second substrate 512, third substrate 513, and fourth substrate 514 in this order on the first substrate 511, so that the recess in which the semiconductor device 520 and the gyro element 100 are accommodated is formed. The substrates 511, 512, 513, and 514 are formed of, for example, ceramics or the like.

The first substrate 511 is provided with a die pad 515 on an electronic component mounting surface 511a on the recess side on which the semiconductor device 520 is mounted. On the die pad 515, the semiconductor device 520 is placed and fixed. The semiconductor device 520 is bonded and fixed on the die pad 515 with, for example, a brazing material (die attach material) 540.

The semiconductor device 520 includes a drive circuit 300 (refer to FIG. 10) as an excitation unit that causes the gyro element 100 to drive-vibrate, and a detection circuit 200 (refer to FIG. 10) as a detection unit that detects a detection vibration generated in the gyro element 100 when an angular velocity is applied. Specifically, the drive circuit 300 included in the semiconductor device 520 supplies drive signals to the drive electrodes 11a, 11b, and 12c and the drive electrodes 11c, 12a, and 12b (refer to FIGS. 2A and 2B) formed on the pair of drive resonating arms 2a and 2b (refer to FIGS. 1A and 1B), respectively, of the gyro element 100. Moreover, the detection circuit 200 included in the semiconductor device 520 amplifies detection signals generated in the first detection electrodes 21a and 21b and the second detection electrodes 22a and 22b, and the second detection electrodes 31a and 31b and the first detection electrodes 32a and 32b (refer to FIGS. 2A and 2B) formed on the pair of detection resonating arms 3a and 3b, respectively, of the gyro element 100, to generate amplified signals. Based on the amplified signals, the detection circuit 200 detects a rotational angular velocity applied to the gyro sensor 500.

The second substrate 512 is formed in a frame-like shape having an opening sized to be able to accommodate the semiconductor device 520 to be mounted on the die pad 515. The third substrate 513 is formed in a frame-like shape having an opening wider than the opening of the second substrate 512, and is stacked and fixed on the second substrate 512. A second substrate surface 512a appears inside the opening of the third substrate 513 after the third substrate 513 is stacked on the second substrate 512, and a plurality of IC connection terminals 512b to which bonding wires BW that are electrically connected with electrode pads (not shown) of the semiconductor device 520 are formed on the second substrate surface 512a. The electrode pads (not shown) of the semiconductor device 520 and the IC connection terminals 512b provided in the package 510 are electrically connected using a wire bonding method. That is, the plurality of electrode pads provided on the semiconductor device 520 and the corresponding IC connection terminals 512b of the package 510 are connected by means of the bonding wires BW. Moreover, any of the IC connection terminals 512b is electrically connected, by means of an internal wiring (not shown) of the package 510, to a plurality of external connection terminals 511c provided on an external bottom surface 511b of the first substrate 511.

The fourth substrate 514 having an opening wider than the opening of the third substrate 513 is stacked and fixed on the third substrate 513. A third substrate surface 513a appears inside the opening of the fourth substrate 514 after the fourth substrate 514 is stacked on the third substrate 513, and a plurality of gyro element connection terminals 513b connected with connection pads (not shown) formed on the gyro element 100 are formed on the third substrate surface 513a. The gyro element connection terminals 513b are electrically connected with any of the IC connection terminals 512b by means of an internal wiring (not shown) of the package 510. The gyro element 100 is placed on the third substrate surface 513a with the first support portion 5b and the second support portion 6b (refer to FIGS. 1A and 1B) of the gyro element 100 being aligned with the connection pads and the gyro element connection terminals 513b, and is bonded and fixed to the third substrate surface 513a with a conductive adhesive 550.

Further, the lid 530 is disposed on the upper surface of the opening of the fourth substrate 514 to seal the opening of the package 510, the interior of the package 510 is airtightly sealed, and thus the gyro sensor 500 is obtained. The lid 530 can be formed by using, for example, metal such as Alloy 42 (iron-nickel alloy containing 42% nickel) or Kovar (iron-nickel-cobalt alloy), ceramics, or glass. For example, when the lid 530 is formed of metal, the lid 530 is bonded to the package 510 by seam welding via a seal ring 560 that is formed by die-cutting Kovar alloy or the like to a rectangular ring-shape. A recessed space formed by the package 510 and the lid 530 serves as a space for the gyro element 100 to operate, and therefore, the space is preferably sealed hermetically to produce a reduced-pressure space or an inert gas atmosphere.

Since the gyro sensor 500 as an electronic device includes the gyro element 100 reduced in cost and having desired detection sensitivity, it is possible to provide the gyro sensor 500 having predetermined detection sensitivity at low cost. Moreover, the gyro sensor 500 of the package type having the configuration described above is advantageous in terms of miniaturization and thinning, and can have increased impact resistance.

In addition to the gyro sensor 500, examples of electronic devices to which the resonator element according to the invention can be applied include, for example, a vibrator as a timing device accommodating the resonator element in a package, and an oscillator as a timing device accommodating, in a package, the resonator element and a circuit element including at least a function of resonating the resonator element.

Electronic Apparatus

Figure 11A:
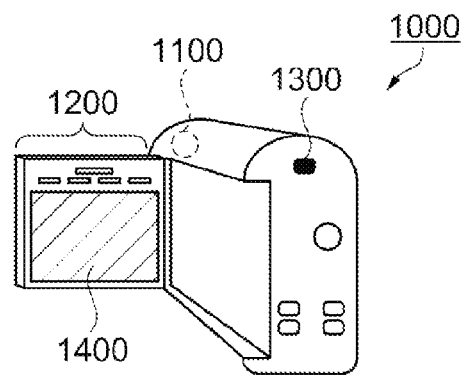
FIGS. 11A to 11C are perspective views each showing one example of electronic apparatuses including the resonator element.
Figure 11B:
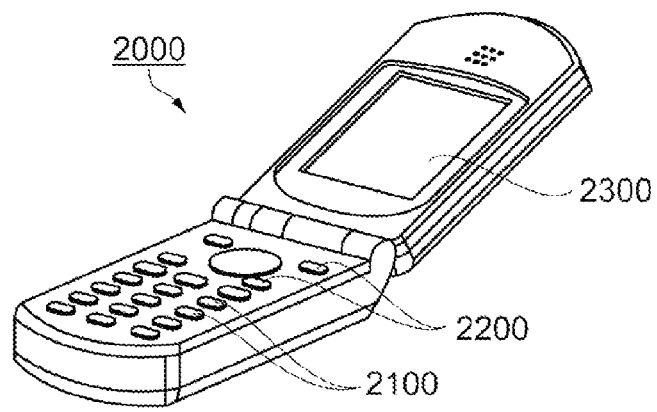
Figure 11C:
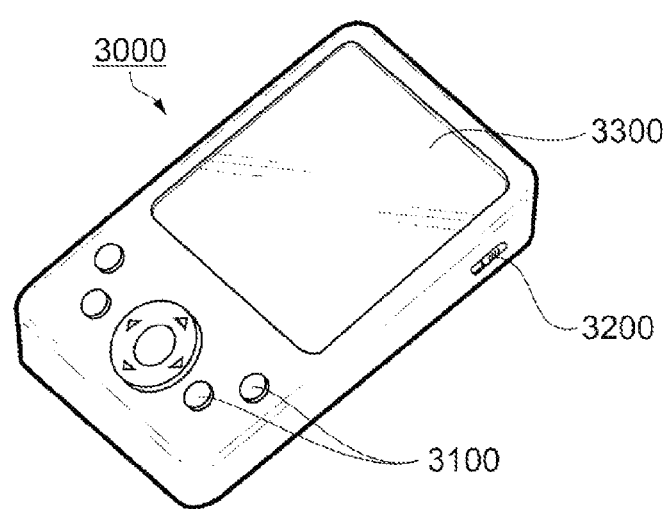

Next, electronic apparatuses including the resonator element according to the embodiment described above will be described with reference to FIGS. 11A to 11C. In the following description, an example of using the gyro element 100 as one example of the resonator element will be described. FIGS. 11A to 11C are perspective views each showing one example of the electronic apparatuses including the gyro element 100.

FIG. 11A shows an example in which the gyro element 100 is applied to a digital camcorder 1000 as an electronic apparatus. The digital camcorder 1000 includes an image receiving section 1100, an operating section 1200, a sound input section 1300, and a display unit 1400. The digital camcorder 1000 can have an image stabilizing function by mounting the gyro element 100 of the embodiment described above.

FIG. 11B shows an example in which the gyro element 100 is applied to a mobile phone 2000 as an electronic apparatus. The mobile phone 2000 shown in FIG. 11B includes pluralities of operation buttons 2100 and scroll buttons 2200, and a display unit 2300. By operating the scroll buttons 2200, a screen displayed on the display unit 2300 is scrolled.

FIG. 11C shows an example in which the gyro element 100 is applied to a personal digital assistants (PDA) 3000 as an electronic apparatus. The PDA 3000 shown in FIG. 11C includes a plurality of operation buttons 3100, a power switch 3200, and a display unit 3300. When the power switch 3200 is operated, various kinds of information such as an address book or a schedule note are displayed on the display unit 3300.

By mounting the gyro element 100 of the embodiment described above on the mobile phone 2000 or the PDA 3000, the mobile phone 2000 or the PDA 3000 can be provided with a variety of functions. For example, when the mobile phone 2000 in FIG. 11B is provided with a camera function (not shown), a camera shake correction can be performed similarly to the digital camcorder 1000. Moreover, when the mobile phone 2000 in FIG. 11B or the PDA 3000 in FIG. 11C is provided with a global positioning system that is widely known as GPS, the position or posture of the mobile phone 2000 or the PDA 3000 can be recognized using the GPS by mounting the gyro element 100 of the embodiment described above.

The resonator elements, one example of which is the gyro element 100, according to the embodiments of the invention can be applied to, in addition to the digital camcorder 1000 in FIG. 11A, the mobile phone in FIG. 11B, and the PDA in FIG. 11C, electronic apparatuses such as an inkjet ejection apparatus (e.g., an inkjet printer), a laptop personal computer, a television set, a camcorder, a video recorder, a car navigation system, a pager, an electronic notebook (including one with communication function), an electronic dictionary, a calculator, an electronic gaming machine, a word processor, a workstation, a videophone, a surveillance TV monitor, electronic binoculars, a POS terminal, a medical apparatus (e.g. an electronic thermometer, a sphygmomanometer, a blood glucose meter, an electrocardiogram measuring system, an ultrasonic diagnosis apparatus, and an electronic endoscope), a fishfinder, various types of measuring instrument, indicators (e.g., indicators used in a vehicle, aircraft, and a ship), and a flight simulator.

Moving Object

Figure 12:
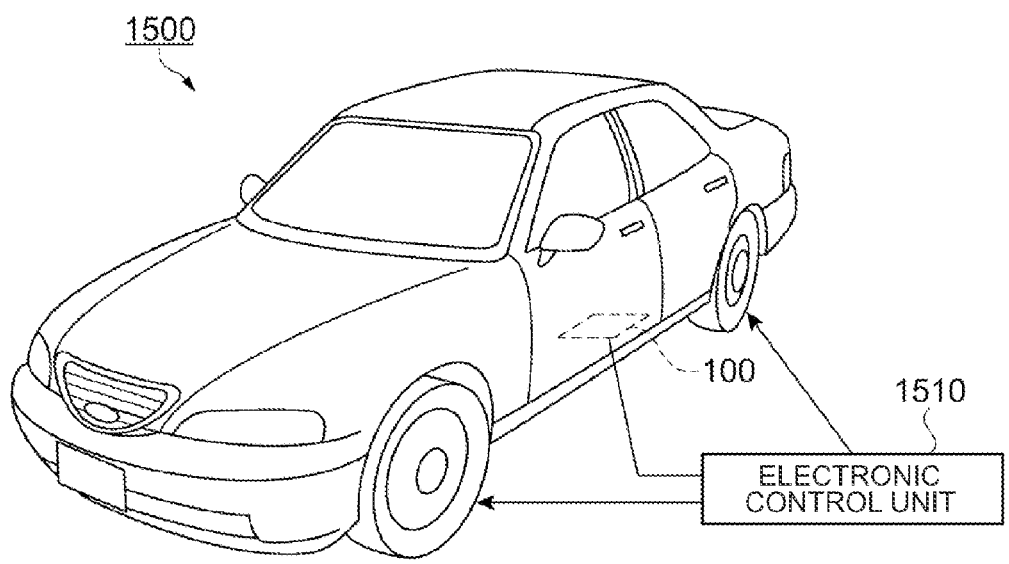
FIG. 12 is a perspective view showing an automobile as a moving object including the resonator element.

Next, a moving object including the resonator element according to the embodiment described above will be described. In the following description, an example of using the gyro element 100 as one example of the resonator element will be described. FIG. 12 is a perspective view schematically showing an automobile as one example of the moving object. In the automobile 1500, the gyro element 100 according to Embodiment 1 is mounted. For example, as shown in the drawing, an electronic control unit (ECU) 1510 into which the gyro element 100 is built to control tires or the like is mounted in a car body of the automobile 1500 as the moving object. In addition, the gyro element 100 can be widely applied to ECUs such as for a keyless entry system, an immobilizer, a car navigation system, a car air-conditioner, an anti-lock brake system (ABS), an air bag, a tire pressure monitoring system (TPMS), engine control, a battery monitor for hybrid and electronic automobiles, and a car body attitude control system.

Although the embodiments have been specifically described, the invention is not limited to the embodiments described above but can be variously modified within the range not departing from the spirit of the invention. For example, an example of using quartz crystal as the forming material of the resonator element or the gyro element as the resonator element has been described in the embodiments, a piezoelectric material other than quartz crystal can be used. For example, aluminum nitride (AlN), an oxide substrate such as lithium niobate ($LiNbO_3$), lithium tantalate ($LiTaO_3$), lead zirconate titanate (PZT), lithium tetraborate ($Li_2B_4O_7$), or langasite crystal ($La_3Ga_5SiO_{14}$), a stacked piezoelectric substrate formed by stacking a piezoelectric material such as aluminum nitride or tantalum pentoxide ($Ta_2O_5$) on a glass substrate, or piezoelectric ceramics can be used. Moreover, the resonator element can be formed using a material other than the piezoelectric material. For example, the resonator element can be formed using a silicon semiconductor material or the like. Moreover, the vibration (drive) system of the resonator element is not limited to the piezoelectric drive system. The configuration and advantageous effects of the invention can be provided in a resonator element of an electrostatic actuator type using an electrostatic force, or a Lorentz drive type using a magnetic force, in addition to the resonator element of the piezoelectric drive type using the piezoelectric substrate.

The entire disclosure of Japanese Patent Application No. 2014-220040, filed Oct. 29, 2014 is expressly incorporated by reference herein.

What is claimed is:

1. A resonator element comprising:
    a drive portion that is driven by application of a voltage; and
    a detection circuit including a detection portion and a charge amplifier, charge being generated in the detection portion in response to a Coriolis force generated in the drive portion, the charge amplifier amplifying an output signal generated in the detection portion based on the charge, wherein
    an allowable range of an amount of charge detected in the detection portion in a state where the Coriolis force is not generated is set to be greater than 0% and equal to or less than 0.1% of an amount of charge generated in the drive portion when driving the drive portion, where the allowable range is set such that an angular velocity applied to the resonator element is detected without saturation of the charge amplifier.

2. The resonator element according to claim 1, further comprising
a base portion, wherein
the drive portion extends from one edge of the base portion, and
the detection portion extends from another edge on the side opposite to the one edge of the base portion with the base portion as a boundary in a plan view.

3. The resonator element according to claim 2, further comprising
a pair of adjustment portions, wherein
the pair of adjustment portions extend from the base portion, so that the pair of adjustment portions are located so as to interpose the detection portion or the drive portion therebetween.

4. The resonator element according to claim 3, wherein
a weight portion is provided on a distal end side of at least one of the drive portion, the detection portion, and the adjustment portions on the side opposite to one edge side of the base portion.

5. An electronic device comprising:
the resonator element according to claim 3;
an electronic component including a drive circuit that excites at least the drive portion; and
a package that accommodates at least one of the resonator element and the electronic component.

6. The resonator element according to claim 2, wherein
a weight portion is provided on a distal end side of at least one of the drive portion and the detection portion on the side opposite to one edge side of the base portion.

7. An electronic device comprising:
the resonator element according to claim 6;
an electronic component including a drive circuit that excites at least the drive portion; and
a package that accommodates at least one of the resonator element and the electronic component.

8. An electronic device comprising:
the resonator element according to claim 2;
an electronic component including a drive circuit that excites at least the drive portion; and
a package that accommodates at least one of the resonator element and the electronic component.

9. The resonator element according to claim 1, further comprising:
a base portion; and
coupling portions extending on both sides of the base portion from the base portion along a first direction, wherein
the detection portion extends on both sides of the base portion from the base portion along a second direction intersecting the first direction, and
the drive portion extends on both sides of each of the coupling portions from each of the coupling portions along the second direction, so that the drive portions are located so as to interpose the detection portions therebetween.

10. The resonator element according to claim 9, wherein
a weight portion is provided on a distal end side of at least one of the drive portion and the detection portion on the side opposite to one edge side of the base portion.

11. An electronic device comprising:
the resonator element according to claim 9;
an electronic component including a drive circuit that excites at least the drive portion; and
a package that accommodates at least one of the resonator element and the electronic component.

12. An electronic device comprising:
the resonator element according to claim 1;
an electronic component including a drive circuit that excites at least the drive portion; and
a package that accommodates at least one of the resonator element and the electronic component.

13. An electronic apparatus comprising the resonator element according to claim 1.

14. A moving object comprising the resonator element according to claim 1.

* * * * *